US012798376B2

(12) United States Patent
Adashchik et al.

(10) Patent No.: US 12,798,376 B2
(45) Date of Patent: Nov. 17, 2026

(54) AI DRIVING ASSISTANT PROVIDING PERSONALIZED AND EMOTIONALIZED DRIVING INSTRUCTIONS

(71) Applicants: Constructor Technology AG, Schaffhausen (CH); Constructor Education and Research Genossenschaft, Schaffhausen (CH)

(72) Inventors: Andrey Adashchik, Istanbul (TR); Ilya Shimchik, Zurich (CH); Serg Bell, Singapore (SG); Stanislav Protasov, Singapore (SG); Nikolay Dobrovolskiy, Alanya (TR); Laurent Dedenis, Geneva (CH)

(73) Assignee: Constructor Technology AG, Schaffhausen (CH)

( * ) Notice: Subject to any disclaimer, the term of this patent is extended or adjusted under 35 U.S.C. 154(b) by 41 days.

(21) Appl. No.: 18/976,413

(22) Filed: Dec. 11, 2024

(65) Prior Publication Data

US 2026/0158911 A1 Jun. 11, 2026

(51) Int. Cl.
*B60K 35/26* (2024.01)
*G01C 21/36* (2006.01)

(52) U.S. Cl.
CPC ........ *B60K 35/265* (2024.01); *G01C 21/3629* (2013.01); *B60K 2360/166* (2024.01); *B60K 2360/741* (2024.01)

(58) Field of Classification Search
CPC ............ B60K 35/265; B60K 2360/166; B60K 2360/741; G01C 21/3629
See application file for complete search history.

(56) References Cited

U.S. PATENT DOCUMENTS

2014/0136187 A1 * 5/2014 Wolverton .............. G10L 15/22 704/9
2020/0286479 A1 * 9/2020 Kurihara ................ B60K 35/22
(Continued)

OTHER PUBLICATIONS

Jianhua Tao et al. "Prosody conversion from neutral speech to emotional speech", 2006. (Year: 2006).*

*Primary Examiner* — Anne Marie Antonucci
*Assistant Examiner* — Misa H Nguyen
(74) *Attorney, Agent, or Firm* — ArentFox Schiff LLP; Michael Fainberg

(57) ABSTRACT

Disclosed herein are systems and method for a machine learning (ML) based method for providing driving instructions in a vehicle, including: acquiring parameters from a plurality of vehicle systems, sensors and other external sources of information; analyzing acquired parameters using a trained driving analysis ML model configured to generate: driving instructions for a driver of the vehicle, and corresponding emotional prosody parameters indicating a level of urgency and/or level of importance of the driving instructions; generating a voice audio recording of the driving instructions; applying to the voice audio recording a trained voice emotionalization ML model configured to modify emotional prosody of the voice audio recording of the driving instructions based on corresponding emotional prosody parameters to generate an emotionalized voice audio recording of the driving instructions; and providing the emotionalized voice audio recording of the driving instructions for audio playback to the driver via a speaker in the vehicle.

20 Claims, 8 Drawing Sheets

(56) References Cited

U.S. PATENT DOCUMENTS

| | | | | |
|---|---|---|---|---|
| 2022/0299335 | A1* | 9/2022 | Carbune | G10L 15/05 |
| 2025/0136130 | A1* | 5/2025 | Shetty | B60W 60/001 |
| 2025/0322821 | A1* | 10/2025 | Tyagi | G10L 13/02 |

* cited by examiner

AI DRIVING ASSISTANT PROVIDING PERSONALIZED AND EMOTIONALIZED DRIVING INSTRUCTIONS

FIELD OF TECHNOLOGY

The present disclosure relates to the field of machine learning (ML), and, more specifically, to systems and methods for artificial intelligence (AI) driving assistance with personalized and emotionalized driving instructions.

BACKGROUND

Digital navigation systems have become popular in recent years and often include maps and live traffic updates provided through smartphones and on-board navigation systems in vehicles, such as cars and trucks. However, conventional navigation systems usually provide only turn-by-turn driving instructions. They do not analyze a vehicle's control system and its surrounding environment to assist the driver in operating the vehicle in dangerous or challenging driving conditions, such as road accidents or poor weather, nor even warn the driver of these conditions. Accordingly, there is a need for a more intelligent driving assistant that can instruct the driver how to operate the vehicle in a safe manner in various driving conditions and situations.

SUMMARY

Aspects of the present disclosure describe an AI-based driving assistant, which addresses the shortcomings of conventional systems described previously. In particular, the AI driving assistant is configured to monitor various vehicle control systems and its surrounding environment and to generate, in real time, driving instructions that assist the driver to operate vehicle in a safe manner in various driving conditions and situations. In one aspect, the AI driving assistant emotionalizes the driving instructions by controlling the prosody parameters of the voice playback to impart a sense of urgency or importance of the driving instructions based, for example, on the level of danger of the driving conditions. This results in an improved driving experience that can alert the driver via audible emotional cues that are based on current driving situations. In another aspect, the AI driving assistant further improves on the conventional systems by personalizing the driving instructions based on a driver's unique qualities, such as driving experience, health conditions, responsiveness, communication style, and more.

In one example aspect, the techniques described herein relate to a machine learning (ML) based method for providing driving instructions in a vehicle, including: acquiring a plurality of parameters from a plurality of vehicle systems, sensors and other external sources of information; analyzing the acquired parameters using a trained driving analysis ML model configured to generate: driving instructions for a driver of the vehicle, and corresponding emotional prosody parameters indicating a level of urgency and/or level of importance of the driving instructions; generating a voice audio recording of the driving instructions, wherein the driving instructions are recorded in a neutral tone of voice with the corresponding emotional prosody parameters set at a predefined base level; applying to the voice audio recording of the driving instructions a trained voice emotionalization ML model configured to modify emotional prosody of the voice audio recording of the driving instructions based on the corresponding emotional prosody parameters to generate an emotionalized voice audio recording of the driving instructions; and providing the emotionalized voice audio recording of the driving instructions for audio playback to the driver via a speaker in the vehicle.

In some aspects, the techniques described herein further include personalizing the driving instructions based on driver profile parameters, including one or more of: driver's spoken language, driver's age, driver's accent, driver's disability, and/or driver's driving experience, to generate personalized driving instructions.

In some aspects, the techniques described herein relate to a method, wherein the plurality of parameters from the plurality of vehicle systems, sensors and other external sources include one or more of: a plurality of vehicle control parameters from at least one vehicle control system; a plurality of vehicle navigation parameters from at least one vehicle navigation system; a plurality of road condition parameters from a plurality of vehicle road sensors; and a plurality of driver condition parameters from one or more driver sensors; and weather conditions and/or road reports from other external sources.

In some aspects, the techniques described herein relate to a method, wherein the driving analysis ML model includes one or more of: Classification models, Regression models and Time Delay Neural Networks (TDNNs); and wherein the voice emotionalization ML model include one or more of: Generative Adversarial Networks (GANs), Variational Autoencoders (VAEs), Sequence-to-Sequence models, Transformer Models.

In some aspects, the techniques described herein relate to a method, further includes training the driving analysis ML model by: providing to the driving analysis ML model a training dataset including: a plurality of training parameters indicating different driving conditions and environments, including: vehicle control parameters, vehicle navigation parameters, road condition parameters, and/or driver condition parameters; predetermined driving instructions, corresponding to the plurality of training parameters, indicating recommended driving actions for a driver of the vehicle to assure safe operation of the vehicle and/or to avoid driving accidents; and predetermined emotional prosody parameters, corresponding to the driving instructions, indicating a preferred emotional prosody of playback of the driving instructions to the driver in order to impart a required level of urgency and/or level of importance to the driving instructions; and training the driving analysis ML model using the provided training dataset In some aspects, the techniques described herein relate to a method wherein personalizing the driving instruction includes: fine-tuning the driving analysis ML model to modify the driving instructions based on one or more driver profile parameters to generate personalized driving instructions; or applying to the driving instructions a trained personalization ML model configured to modify the driving instructions based on one or more driver profile parameters, wherein the personalization ML model includes one or more machine learning architectures.

In some aspects, the techniques described herein relate to a method that further includes training the driving analysis ML model and/or the personalization ML model to personalize the driving instruction, including: providing to a ML model a training dataset, including: a plurality of predetermined driving instructions; a plurality of predetermined driver profile parameters, including: driver's spoken language, driver's age, driver's accent, driver's disability and/or driver's driving experience; and a plurality of personalized driving instructions corresponding to the plurality of predetermined driving instructions modified based on one or more driver profile parameters; and training the ML model using the provided training dataset.

In some aspects, the techniques described herein relate to a method wherein generating a voice audio recording of the driving instructions further comprises one or more of: converting the driving instructions into audio using a voice synthesizer; selecting a pre-recorded voice audio clip corresponding to the driving instructions from a database of pre-recorded voice audio clips.

In some aspects, the techniques described herein relate to a method that further includes training the voice emotionalization ML model, including: providing to the voice emotionalization ML model a training dataset including: a plurality of pre-recorded emotionalized voice audio recordings of driving instructions with spatial features corresponding to different driving conditions and environments, and corresponding prosody parameters for each audio recording; and the same pre-recorded audio recordings of driving instructions in a neutral-tone voice, and corresponding prosody parameters set at the base level; and training the voice emotionalization ML model using the provided training dataset In some aspects, the techniques described herein relate to a ML-based system for providing driving instructions in a vehicle, including: at least one memory; and at least one processor coupled with the at least one memory and configured, individually or in combination, to: acquire a plurality of parameters from a plurality of vehicle systems and sensors; analyze the acquired parameters using a trained driving analysis ML model configured to generate: driving instructions for a driver of the vehicle, and corresponding emotional prosody parameters indicating a level of urgency and/or level of importance of the driving instructions; generate a voice audio recording of the driving instructions, wherein the driving instructions are recorded in a neutral tone of voice with the corresponding emotional prosody parameters set at a predefined base level; apply to the voice audio recording of the driving instructions a trained voice emotionalization ML model configured to modify emotional prosody of the voice audio recording of the driving instructions based on the corresponding emotional prosody parameters to generate an emotionalized voice audio recording of the driving instructions; and provide the emotionalized voice audio recording of the driving instructions for audio playback to the driver via a speaker in the vehicle.

In some aspects, the techniques described herein relate to a non-transitory computer readable medium storing thereon computer executable instructions for providing driving instructions in a vehicle, including instructions for: acquiring a plurality of parameters from a plurality of vehicle systems and sensors; analyzing the acquired parameters using a trained driving analysis ML model configured to generate: driving instructions for a driver of the vehicle, and corresponding emotional prosody parameters indicating a level of urgency and/or level of importance of the driving instructions; generating a voice audio recording of the driving instructions, wherein the driving instructions are recorded in a neutral tone of voice with the corresponding emotional prosody parameters set at a predefined base level; applying to the voice audio recording of the driving instructions a trained voice emotionalization ML model configured to modify emotional prosody of the voice audio recording of the driving instructions based on the corresponding emotional prosody parameters to generate an emotionalized voice audio recording of the driving instructions; and providing the emotionalized voice audio recording of the driving instructions for audio playback to the driver via a speaker in the vehicle.

It should be noted that the methods described above may be implemented in a system comprising at least one hardware processor and memory. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
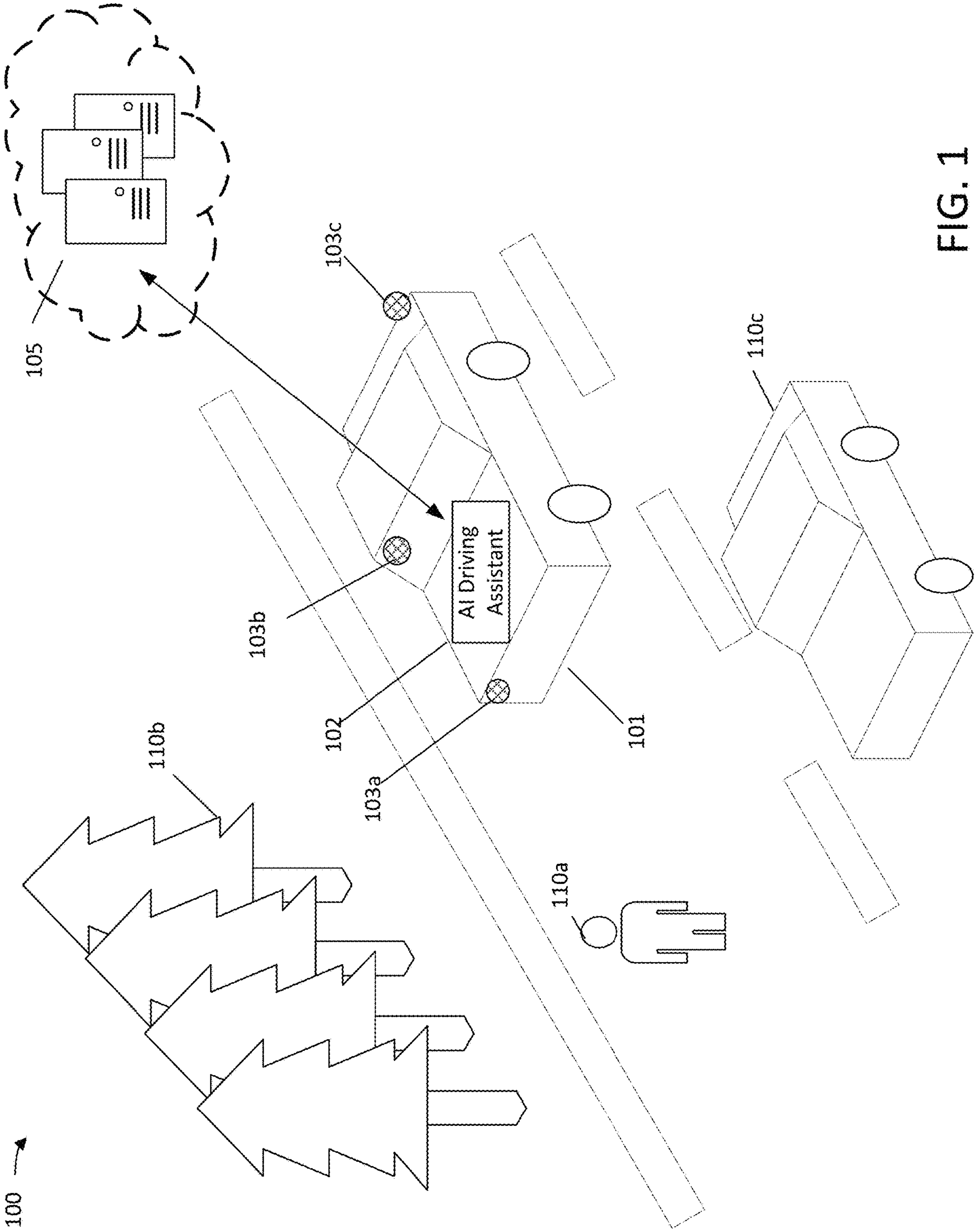
FIG. 1 is a diagram illustrating a vehicle with an AI based driving assistant.

Example aspects are described herein in the context of a system, method, and computer program product for providing AI-based driving assistance. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In various aspects of the present disclosure, an AI driving assistant is configured to: monitor various vehicle control systems and its surrounding environment and generate, in real time, driving instructions that assist the driver to operate vehicle in a safe manner in various driving conditions and situations. The AI driving assistants can provide audible comments such as recommendations, suggestions, instructions, orders, and/or commands to one or more drivers or operators of a vehicle. These audible comments can relate to one or more aspects of a transportation experience, such as navigation, control, status, and/or operation of the vehicle before, during, and/or after transit from a starting location to a destination location. In one aspect, the AI driving assistant emotionalizes the driving instructions by controlling the prosody parameters of the voice playback of the driving instructions to impart a sense of urgency or importance of the driving instructions in accordance with the level of danger of the driving conditions. For example, if the driving instructions are "Watch out for incoming vehicle!", the AI driving assistant may emotionalize the driving instruction by outputting the particular driving instruction in an fast, loud, and sharp tone of voice since the level of danger of the driving condition is high. As another example, if the driving instructions are "Fuel tank is half full," the AI driving assistant may emotionalize the driving instruction by outputting the particular driving instruction in a soft and calm voice since the danger level of the driving condition is low.

In another aspect, the AI driving assistant personalizes the driving instructions based on drivers unique qualities, such as driving experience, health conditions, responsiveness, communication style, and more. As an example, if the driver is an elderly man that is hard of hearing, then the driving instructions may be personalized as loud, simple and clear such that it is easier for the driver to understand and hear.

While the various aspects described herein are generally described in terms of manually (i.e., human) controlled vehicles, some or all of these aspects can be employed in autonomous or semi-autonomous vehicles as well. For example, many autonomous vehicles include manual override systems and can benefit from a driver (e.g., operator) or passenger of the autonomous vehicle by providing personalized descriptions and/or instructions of what has, is, or will happen as the associated vehicle moves through a physical space.

Turning now to the figures, example aspects are depicted with reference to one or more components described herein, where components in dashed lines may be optional.

FIG. 1 is a diagram 100 illustrating a vehicle 101 equipped with an AI driving assistant 102. As shown in diagram 100, a vehicle 101 can operate in the physical world where physical objects may be encountered while driving, such as fauna 110*a* (e.g., one or more person(s) and/or animals), one or more natural objects 110*b* (e.g., trees, boulders, rocks, bushes, grass, sand dunes, permanent or temporary bodies of water (e.g., water on a roadway, ponds, lakes, streams, oceans, hills, mountains, cliff faces), and/or one or more human made objects 110*c* (e.g., other vehicles, signs, buildings, bridges, curbs, walls). The AI driving assistant 102 can be integrated with, compatible with, complementary to, and/or supplemental to one or more other systems of vehicle 101. In one aspect, the AI driving assistant 102 can be integrated with a vehicle operating system of vehicle 101 that controls one or more aspects of vehicle control and/or operation. In some aspects, the AI driving assistant 102 can be located on or in a secondary device such as a smartphone and/or proprietary navigation device that can be transported in vehicle 101 and may or may not be linked through a wired or wireless connection and/or coupling to a vehicle computer system of vehicle 101. In some aspects, the AI driving assistant 102 can communicate with one or more server(s) 105 via a wireless connection and/or coupling over a data network including one or more transmission and/or reception components and/or systems operable to send and/or receive data (e.g., via one or more cell tower, device-to-device (D2D) communication link, vehicle to vehicle (V2V) communication link, and/or satellite). In various aspects, the AI driving assistant 102 can be integrated with, request, and/or receive data from one or more sensors of the vehicle 101, such as environment monitoring sensors 103*a*, driver monitoring sensors 103*b*, and/or vehicle control sensors 103*c*.

In some aspects, the AI driving assistant 102 of the vehicle 101 can communicate and/or coordinate with one or more other AI driving instructions system(s) of one or more other vehicle(s) (e.g., providing real-time or near real-time coordination about what other vehicles and/or drivers are doing or their state). For example, the AI driving assistant 102 can provide a driver of vehicle 101 with an audible description of what a driver of another vehicle is doing (e.g., turning, slowing down, speeding, excessively braking, or otherwise) and/or their state (e.g., distracted, drowsy, drunk, alert, manic, or otherwise).

An ML-based system for providing driving instructions with dynamic emotional prosody offers a range of technical improvements, including personalized and adaptive instruction generation, real-time context analysis, enhanced human-machine interaction, and better driver response to urgent situations. By leveraging ML, the system becomes more flexible, scalable, and capable of learning from real-world data, ultimately improving both safety and user experience in the vehicle.

Implementing the AI driving assistant 102 of the vehicle 101 for providing driving instructions in a vehicle, as described, offers several technical improvements over traditional rule-based or static systems. For example, AI driving assistant 102 can analyze real-time driving parameters from the vehicle's 101 systems, sensors, and external sources to generate instructions that are highly contextual. Unlike static pre-programmed systems, the AI driving assistant 102 dynamically adjusts the driving instructions based on changing conditions such as speed, road layout, weather, and traffic. In addition, the AI driving assistant 102 can learn and adapt to individual driver behaviors or preferences, providing more personalized instructions, that help reduce stress, improve compliance, and enhance the driving experience.

As another example, the AI driving assistant 102 improves enhanced accuracy of decision making. The AI driving assistant 102 can simultaneously analyze a multitude of inputs from various systems and sensors (e.g., speed, proximity to other vehicles, road conditions) in real time. This allows for a more accurate generation of driving instructions, reflecting a comprehensive view of the driving environment. Traditional systems may use simple thresholds for decision-making (e.g., speed limit detection), but an ML-based system can recognize more complex driving patterns (e.g., sudden deceleration of nearby vehicles, predicted lane changes, driver fatigue), leading to more precise instructions.

In addition, the AI driving assistant 102 enables dynamic emotional prosody for effective communication to drivers. The use of an ML-based voice emotionalization model enables the system to adjust the emotional prosody (e.g., tone, pitch, speech rate) in real-time, based on the urgency or importance of the driving situation. For example, in high-risk situations, instructions can be delivered in a more urgent tone, improving the likelihood that the driver will respond appropriately. Emotional prosody can be used to capture the driver's attention more effectively, especially in critical situations, compared to flat, neutral-toned instructions. This is particularly useful in reducing reaction times for urgent driving maneuvers. In addition, by modifying the emotional prosody of the driving instructions, the system provides more natural and human-like feedback. This can make interactions with the system feel more conversational and intuitive for drivers, reducing cognitive load and improving ease of use. Properly modulated emotional cues in the voice instruction help clarify the importance of certain actions (e.g., emergency braking vs. a lane change). This minimizes confusion and allows the driver to prioritize actions correctly.

Furthermore, the ML models in the AI driving assistant 102 can be updated continuously based on new driving data, allowing the system to improve its accuracy over time. As more driving scenarios and driver behaviors are encountered, the model becomes better at generating appropriate instructions and adjusting prosody based on urgency. The system can gather feedback from driver interactions, such as whether the driver followed the instruction or not, to refine both the driving analysis and emotional prosody models. This iterative learning process helps in making the instructions more aligned with real-world driving contexts.

Figure 2A:
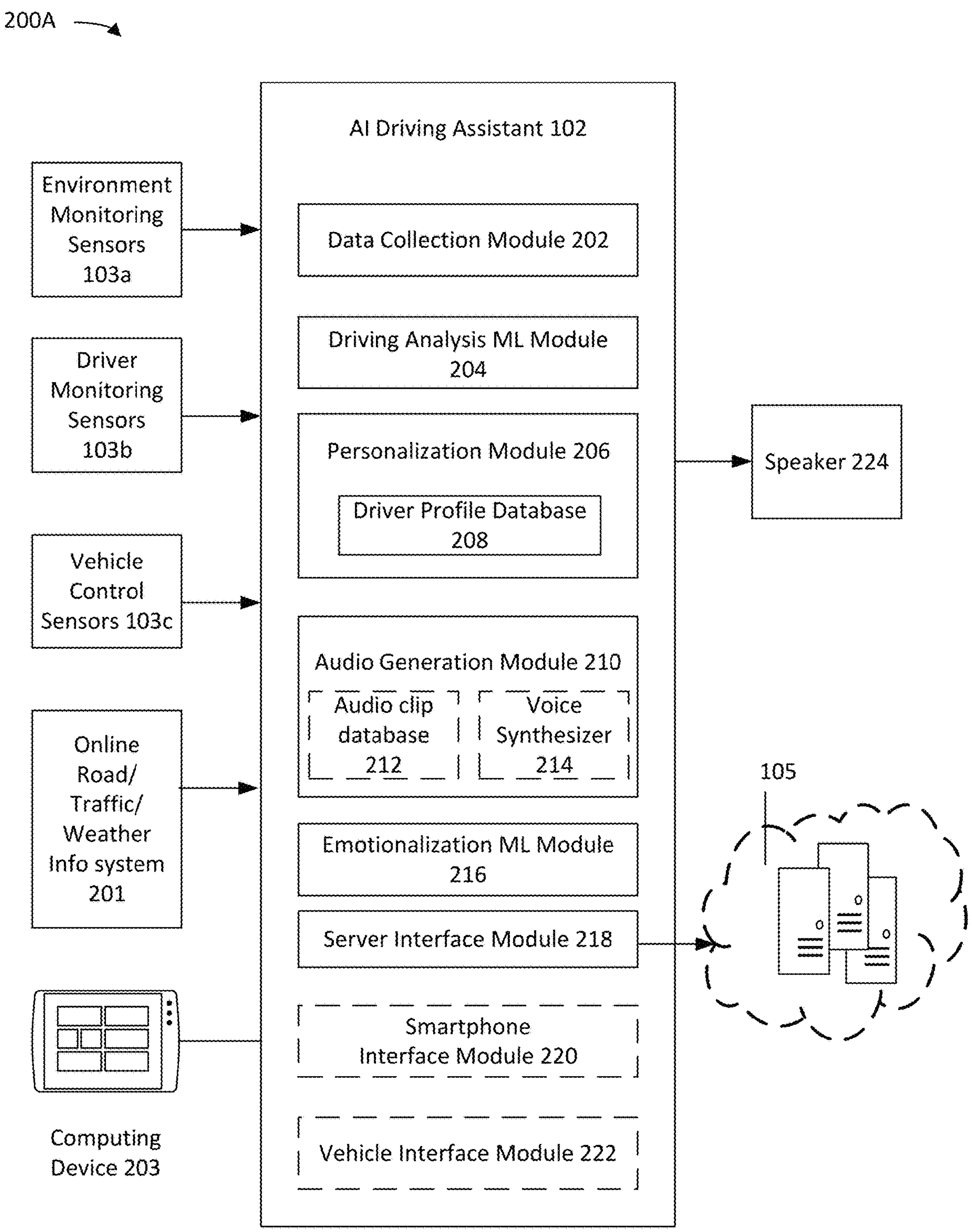
FIG. 2A is a block diagram illustrating an AI driving instructions system.

FIG. 2A is a block diagram illustrating an AI driving assistant 102 configured to generate driving instructions and provide an emotionalized voice audio recording of the driving instructions for audio playback to a driver of the vehicle. The system 200A may include at least a computing device 203, environment monitoring sensors 103*a*, driver monitoring sensors 103*b*, vehicle control sensors 103*c*, and/or road, traffic, and/or weather information system(s) 201, and an AI driving assistant 102, which may be a software installed on or accessed (e.g., via a virtual machine, container, web application) on the computing device 203.

The computing device 203 may be embedded into the vehicle 101 by integrating hardware and software systems into the vehicle's architecture to support various functions, such as control, monitoring, safety, and communication. The computing device 203 may execute a plurality of modules in the AI driving assistant 102 that together make up a retrieval, recognition, and analysis system. In some aspects, the AI driving assistant 102 may correspond to a computing device 203 that is configured to execute a plurality of modules that together make up the AI driving assistant 102.

The AI driving assistant 102 may then be configured to generate and output driving instructions for the driver of the vehicle 101 and determine a corresponding emotional prosody parameter indicating a level of urgency and/or level of importance of the driving instructions. Emotional prosody parameters refer to the acoustic features of speech that conveys emotions, attitudes, or mood. Prosody involves the rhythm, intonation, pitch, loudness, and tempo of spoken language. When emotional content is added, these elements are modulated to express specific feelings. Emotional prosody allows listeners to infer the speaker's emotional state and make computer-generated speech appear more life-like and more naturally engaging with the listener. In addition, the AI driving assistant may also personalize driving instructions based on driver profile parameters, including one or more of a driver's spoken language, driver's age, driver's accent, driver's disability and/or driver's driving experience.

In particular, the AI driving assistant 102 may obtain and/or access data from one or more of a variety of sensors including at least include environment monitoring sensors 103*a*, driver monitoring sensors 103*b*, vehicle control sensors 103*c*, and/or road, traffic, and/or weather information system(s) 201.

Environment monitoring sensors 103*a* are crucial components of both autonomous vehicles and/or advanced driver assistance systems (ADAS). Examples of environment monitoring sensors 103*a* may include radio detection and ranging (Radar) sensors, optical sensors (e.g., video cameras), ultrasonic sensors, infrared sensors, Global Positioning System (GPS), inertial measurement unit (IMU), temperature/weather sensors, V2X communication sensors, air quality and pollution sensors, lighting sensors, and/or proximity sensors (e.g., Light Detection and Ranging (LiDAR)). The environment monitoring sensors 103*a* provide real-time data about the surrounding environment, enabling the vehicle 101 to understand their surroundings, make decisions, and ensure the safety of passengers and other road users by enabling a car to perceive its surroundings in real time and react accordingly. In addition, the environment monitoring sensors 103*a* provide detailed information about road conditions, vehicle position, and the environment, enabling more precise navigation. Furthermore, environment monitoring sensors 103*a* that monitor weather, temperature, and road conditions allow vehicles to adapt to external factors. For example, if the environment monitoring sensors 103*a* detects rain, the vehicle 101 may increase following distances or reduce speed to improve traction and braking performance.

The driver monitoring sensors 103*b* are designed to ensure that the driver of the vehicle remain alert, attentive, and capable of safely operating the vehicle 101. The driver monitoring sensors 103*b* play a critical role in improving road safely, especially in semi-autonomous vehicles (e.g., Level 2 and Level 3 semi-autonomous vehicles), where drivers still need to be engaged and ready to take control of the vehicle 101 when necessary. Examples of driver monitoring sensors 103*b* may include one or more alertness sensors such as eye-tracking sensors, head position and movement sensors, facial expression and gaze detection sensors, steering wheel sensors, driver posture and seat sensors, breathalyzer sensors, lane-keeping sensors, and/or cognitive load sensors. The driver monitoring sensors 103*b* help prevent accidents due to fatigue and drowsiness, mitigating distractions, and/or reducing risks from impaired driving. In Level 2 and 3 semi-autonomous vehicles, drivers are still required to take control in certain situations. The driver monitoring sensors 103*b* may ensure that the driver is alert and ready to take over the vehicle 101 when needed. By constantly monitoring the driver's state, the driver monitoring sensors 103*b* allow vehicles to intervene when necessary. For example, if a driver becomes unresponsive due to a medical condition, the vehicle 101 can automatically slow down, stop, or even alert emergency services.

The vehicle control sensors 103*c* are designed to help monitor and control various mechanical and electronic systems to ensure smooth operation, optimal performance, and safety. The vehicle control sensors 103*c* provide data to the vehicle's control systems (e.g., engine control unit, braking system, steering systems), allowing the vehicle 101 to respond to dynamic driving conditions. Examples of vehicle control sensors 103*c* include one or more brake pressure sensors, steering wheel position sensors, wheel speed sensors, yaw rate sensor, vehicle position sensors, vehicle direction sensors, accelerometer, turn signal sensors, tire pressure sensors, oxygen sensors, temperature sensors, fuel pressure sensors, parking sensors, and/or lane departure sensors. The vehicle control sensors 103*c* are critical for maintaining stability, traction, and braking performance in various driving conditions. In addition, the vehicle control sensors 103*c* may also optimize engine performance, fuel consumption, and gear shifting by providing accurate data to the engine and transmission control unit. In this way the vehicle 101 may operate at peak efficiency, reducing wear and tear, saving fuel, and lowering emissions.

The road, traffic, and/or weather information system(s) ("RTWIS") 201 refer to various in-vehicle technologies designed to provide real-time data about current road conditions, traffic congestion, and weather. For example, the RTWIS may provide detailed maps and navigation routes such as showing road layouts, points of interests, and possible alternative routes to avoid traffic. As another example, the RTWIS may use data from sensors, satellites, and crowd-sourced information to provide live updates on traffic flow and congestion. As yet another example, the RTWIS may allow drivers to receive updates on weather conditions along their planned routes, alert drivers to extreme weather conditions that could make driving dangerous, and/or display data about road surface temperatures and visibility.

The AI driving assistant 102 may include a data collection module 202, a driving analysis ML module 204, a personalization module 206, an audio generation module 210, an emotionalization ML module 216, a server interface module 218, an optional smartphone interface module 220, and an optional vehicle interface module 222. The AI driving assistant 102 may be connected to a speaker 224, a driver profile database 208, an audio clip database 212, and/or one or more servers 105. In some aspects, these databases may be hosted in a cloud environment.

The computing device 203 may execute a data collection module 202 configured to collect data from the one or more of the environmental monitoring sensors 103*a*, driver monitoring sensors 103*b*, vehicle control sensors 103*c*, and one or more RTWIS 201 that is configured to receive one or more of road conditions, traffic, and weather information via wireless connection through one or more of a vehicle integrated system, smartphone or other personal device system, and proprietary system that can be an application operating on such system(s). This data can include one or more vehicle control parameters, environmental parameters, driver status parameters, and/or information system parameters. Examples of vehicle control parameters include steering wheel position (e.g., actual, desired, and/or differences therebetween). Examples of environmental parameters can include weather conditions; track, road, trail, and/or other driving surface parameters; danger and/or hazard parameters; obstacle parameters (e.g., related to inanimate objects such as trees, boulders, curbs, walls, etc., and/or related to animate objects such as people and/or animals); and lighting parameters.

The computing device 203 may execute a driving analysis ML module 204 configured to generate one or more text commands and/or emotional prosody parameters. Examples of driving instructions can include situational information such as "Avoid pedestrian ahead at distance x", "slow down for hazardous roadway ahead and in the next lane to the left", "reduce speed due to rainfall increasing at y rate", "pay attention due to the driver being distracted by passenger in rear seat", "pull over and rest due to a driver falling asleep", or various others. Examples of emotional prosody parameters can include one or more of volume, speed, pitch, intensity, space direction of a voice. Once the text commands are generated by the driving analysis ML model, the commands can be sent to a personalization module 206.

The driving analysis ML module 204 can include one or more of a situation classifier, regression classifier, and Time Delay Neural Network (TDNN) model.

A situational classifier is a type of machine learning model that makes predictions or classifications based on the specific context or situation in which data appears. Instead of simply mapping input features to output classes in a static, one-size-fits-all manner, a situational classifier adapts its behavior depending on the particular circumstances surrounding the data. The concept of situational classification is especially useful in domains where the relationship between input data and output predictions changes depending on the context, environment, or state of the system.

A situational classifier explicitly takes into account additional variables (often referred to as situational features) that describe the context in which the data was generated. These situational features help to adapt the decision-making process of the classifier. For example, in a human activity recognition task, situational features might include time of day, location, or weather conditions, which help the classifier better understand the current situation and make more accurate predictions. In addition, the decision boundaries or rules that the classifier uses to make predictions can change based on the situation. This allows the classifier to adjust to different contexts. For instance, an algorithm that predicts driving behavior might behave differently in a rural area than it does in an urban environment, depending on situational variables like traffic conditions, road types, and time of day.

The situational classifier receives not only the typical features used for classification but also a set of contextual features that represent the current situation. These contextual features could be anything relevant to the task at hand, such as time, location, environmental conditions, user preferences, or system states. The model uses these situational features to adjust its internal parameters or classification strategy. It may use different classification models for different contexts or adapt the weights of features based on the situation. Once the model has accounted for both the input features and the situational context, it makes a classification decision based on this adapted understanding of the data.

A regression classifier refers to a hybrid approach in machine learning where a regression model is used to solve a classification problem. While classification and regression are traditionally separate types of tasks (classification involves predicting discrete labels and regression involves predicting continuous values), the term "regression classifier" comes into play when regression techniques are employed to predict probabilities or scores, which are then converted into class labels.

A TDNN model is a type of artificial neural network designed to process sequential data, particularly time-series data such as audio signals, speech, and more. The key feature that distinguishes TDNNs from other types of neural networks is their ability to capture patterns over a sequence of inputs with time delays or shifts. An input to a TDNN is typically a sequence of time-ordered data points. For example, in speech recognition, the input might be a sequence of audio features extracted from short frames of the speech signal. The TDNN then captures information from past (and potentially future) frames of input by applying time delays. Each neuron in the network processes not just one frame of data but a set of time-delayed frames. This enables the network to recognize patterns across time. TDNNs can have multiple hidden layers, where each neuron processes a window of time-delayed inputs and passes its output to the next layer. These layers gradually combine and abstract temporal information. The final layer of the TDNN typically produces predictions or classifications based on the temporal patterns it has learned. In speech recognition, this could be a sequence of phoneme or word predictions.

To train a driving analysis ML module 204 that can analyze parameters from the one or more of the environmental monitoring sensors 103*a*, driver monitoring sensors 103*b*, vehicle control sensors 103*c*, and one or more RTWIS 201 and generate driving instructions along with emotional prosody parameters (which indicate urgency or importance), a framework will need to combine data acquisition, feature engineering, model development, and training.

For classification and regression tasks such as generating driving instructions and corresponding emotional prosody parameters, an untrained model in the driving analysis ML module 204 will first analyze parameters from the training dataset to identify driving parameters (speed, acceleration, proximity to other vehicles, etc.) and predetermined driving instructions to generate appropriate driving directions based on the analysis of the driving parameters.

The first part of training the driving analysis ML model is considered a classification problem because the goal is to predict discrete classes (e.g., instructions like "slow down," "change lanes," "speed up," etc.) and, based on the driving context, the model must assign the most appropriate instruction to the current situation. As an example, the plurality of training parameters indicating different driving conditions and environments, including: vehicle control parameters, vehicle navigation parameters, road condition parameters, and/or driver condition parameters and the plurality of predetermined driving directions corresponding to the plurality of training parameters, indicating recommended driving actions for a driver of the vehicle to assure safe operation of the vehicle and/or to avoid driving accidents. In summary, this is a supervised classification task, where the input features are driving parameters (time-series data), and the output is a label from a set of predefined instructions.

The second part of training the driving analysis ML model is considered a regression problem because the goal is to predict prosody features such as tone, pitch, speed, and volume to reflect the urgency and importance of the driving instructions. Emotional prosody features are typically continuous values—a pitch parameter may be a continuous value representing how high or low the tone should be, a volume parameter may be a continuous value representing how loud or soft the instructions should be delivered, a speech rate may be a continuous value representing how fast the instructions should be delivered. Since these prosody features (pitch, volume, speed, etc.) are continuous values, this becomes a regression problem. The task is to predict a set of real-valued parameters based on the driving context and the predicted instruction. As an example, the plurality of training data may include predetermined emotional prosody parameters, corresponding to the driving instructions, indicating a preferred emotional prosody of playback of the driving instructions to the driver in order to impart a required level of urgency and/or level of importance to the driving instructions. In summary, this is a supervised regression task, where the input is a combination of driving parameters and the predicted instruction, and the output is a set of continuous prosody features.

The driving analysis ML model may also include a multitask learning (MTL) model where a single model is trained to handle both the classification task (e.g., predict the driving direction based on the driving parameters) and the regression task (e.g., predict emotional prosody parameters based on both the driving parameters and the predicted instruction). In the MTL learning model, a shared base of features is learned from the driving parameters, which is then used to generate both the classification output (driving instructions) and the regression output (prosody features).

During training of the driving analysis ML model in the driving analysis ML module 204, the training dataset comprising at least as plurality of training parameters, predetermined driving instructions, and predetermined emotional prosody parameters that are input through an untrained driving analysis ML model in the driving analysis ML module. The results from the untrained driving analysis ML model are then compared with known data set results (e.g., training set) using the corresponding driving instruction labels identifying the driving instructions and prosody parameter labels identifying the prosody features. It should be noted that the input to the driving analysis ML module 204 will only be the training parameters from the training dataset.

For every input training sample from the training dataset, the driving analysis ML model from the driving analysis ML module 204 will produce a prediction consisting of values representing the probability that the input parameters corresponds to a given class (e.g., a given driving instruction and a prosody feature). The output with the highest probability determines the predicted driving instruction and prosody parameter labels. A class label for each parameter is used to compute a loss (e.g., loss function).

Reinforcement learning may also be applied to make the driving analysis ML model more adaptive (e.g., adjusting its driving instructions and done based on the driver's response to past instructions). In an RL framework, the driving analysis ML model can learn by interacting with the environment (e.g., driving scenario), where the driver's feedback and behavior are used as rewards. The model can then adapt its driving instructions and prosody to optimize for better driver compliance or safter driving over time.

Once the driving analysis ML model is properly trained (e.g., inference), the driving analysis ML module 204 contains a trained driving analysis ML model (e.g., MTL combining a classification task and a regression task) configured to generate context-aware driving instructions and the appropriate emotional tone for the driving instruction. As such, the driving analysis ML module 204 is trained to generate driving instructions for a driver of the vehicle and corresponding emotional prosody parameters to indicate a level of urgency and/or level of importance of the driving instructions in response to analyzing the acquired parameters from the data collection module 202.

During inference, the trained driving analysis ML model from the driving analysis ML module 204 does not re-evaluate or adjust the layers of the trained driving analysis ML model based on the results. Instead, the inference applies knowledge from the trained driving analysis ML model and uses it to infer a result (e.g., generation of a driving instruction with corresponding emotional prosody parameters). Accordingly, when a new unknown dataset is input through the trained driving analysis ML model, the trained driving analysis ML outputs a prediction of what driving instruction to generate and what emotional prosody parameter to apply to the driving instruction.

The computing device 203 may execute a personalization module 206 configured to access or receive a profile for a driver that is stored in non-transitory computer readable memory in a driver profile database 208. An example of a driver profile that can be stored in a driver profile database 208, can include various information, data, and/or statistics about a particular driver. Examples of this information, data, and/or statistics can include a driver identifier (e.g., one or more of a unique number, a name, and a code), a driver age, a driver experience level (e.g., seasoned professional racecar driver, commercial driver, weekend driver, amateur racer, novice, trainee, etc.), health information (e.g., nearsighted or farsighted, amputee, etc.), driver impairment information, driver violations information (e.g., charged with or convicted of reckless driving, speeding, driving under the influence, etc.), reaction time information, driver temperament (e.g., skittish, confident, cautious, scared, aggressive, etc.). The personalization module 330 can use the driving instructions from the driving analysis ML module 204 and the driver profile parameters from the driver profile database 208 to generate personalized instructions for the driver, which can be sent to an audio generation module 210.

In some aspects, the personalization model 206 may include one or more machine learning architectures selected from a group consisting of: Classification models (classify drivers based on experience level), Generative adversarial networks (GANs)—personalized speech patterns, Rule-based systems enhanced with machine learning (adjusting tone and complexity based on the driver's experience level), Transformer models: consider age, language preference, accent, and disability status simultaneously to generate personalized instruction, Meta-learning models: effectively personalize instructions for drivers with unique profile parameters, Regression models, or Recurrent neural networks (RNNs), Long short-term memory (LSTM) networks. Accordingly, the machine learning models may be executed sequentially.

In some aspects, training the personalization ML model to personalize the driving instruction, including: providing to a ML model a training dataset, comprising: a plurality of predetermined driving instructions; a plurality of predetermined driver profile parameters, including: driver's spoken language, driver's age, driver's accent, driver's disability and/or driver's driving experience; and a plurality of personalized driving instructions corresponding to the plurality of predetermined driving instructions modified based on one or more driver profile parameters; and training the personalization ML model using the provided training dataset.

The computing device 203 may execute an audio generation module 210, optionally including an audio clip database 212 and/or a voice synthesizer 214, configured to generate voice audio instructions for a driver based on the personalized instructions generated by the personalization module 206, and optionally based on the driving instructions generated by driving analysis ML module 204. The voice audio instructions generated by audio generation module 210 can be neutral, meaning they can be without any emotion. Voice audio instructions can be sent to emotionalization ML module 216 for applying emotional prosody parameters The computing device 203 may execute an emotionalization ML module 216 can be configured to generate emotionalized audio instructions based on the received voice audio instructions from audio generation module 210 and emotional prosody parameters from the driving analysis ML module 204. These emotionalized audio instructions can be expressive and can include one or more aspects including persuasion, mood, tone, and volume. Emotionalized audio instructions can be sent to a speaker 224 for output to a driver, which converts them from electrical signals into audible sounds that the driver can hear.

The voice emotionalization ML model may include one or more of a Generative Adversarial Networks (GANs), Variational Autoencoders (VAEs), or Sequence-to-Sequence models.

A GAN comprises a generator and a discriminator trained simultaneously through adversarial training. The generator aims to generate realistic data, while the discriminator tries to distinguish between real and generated data. A GAN is widely used for image and content generation tasks.

A Variational Autoencoder (VAE) is a type of generative model in machine learning, specifically in deep learning, designed to learn efficient low-dimensional representations of high-dimensional data and generate new, similar data points. VAEs are a variant of traditional autoencoders but with a probabilistic twist, allowing them to generate new data from the learned latent space.

A Sequence-to-Sequence (Seq2Seq) model is a class of models used in machine learning, particularly in natural language processing (NLP), for transforming one sequence into another sequence. These models are highly effective for tasks where the input and output data are both sequences but may vary in length and structure, such as in machine translation, text summarization, and speech recognition.

To build a voice emotionalization ML model that modifies the emotional prosody of a voice audio recording (e.g., computer-generated driving instruction speech), the voice emotionalization ML model will need to be capable of manipulating the prosodic features of computer-generated speech such as pitch, tone, intensity, speech rate, and intonation. The emotionalization ML model will take the voice audio instructions as input, along with the emotional prosody parameters (e.g., indicating urgency or calmness) from the driving analysis ML module 204 and generate an audio output with the modified emotional tone.

An untrained voice emotionalization ML model in the emotionalization ML module 216 will first analyze the pre-recorded emotionalized voice recordings of driving instructions to modify and/or synthesize speech audio based on specific prosodic inputs. As an example, the training dataset may include a plurality of pre-recorded emotionalized voice audio recordings of driving instructions corresponding to different driving conditions and environments and corresponding prosody parameters for each audio recording (e.g., emotional voice recordings) and the same pre-recorded audio recordings of driving instructions in a neutral-tone voice, and corresponding prosody parameters set at the base level (e.g., neural, unemotional recordings). In addition, the training dataset may include labeled data for the prosody features that represent the different emotions. Examples of common prosody parameters include pitch (e.g., higher pitch for urgency, lower pitch for calmness), volume (e.g., louder for urgency, softer for calmness), speech rate (faster speech for urgency, slower speech for calmness), and pause duration and placement (e.g., shorter pauses indicate urgency, longer pauses suggest calmness). In some aspects, this training datasets may be generated using existing emotional speech datasets such as IEMOCAP or Emo-DB. In some aspects, this training dataset may be recorded by a voice actor providing multiple emotional versions of driving instructions and labeled by prosody characteristics.

Once a training dataset is obtained, a next step may be to extract relevant prosodic features from the audio recordings. These features are necessary both for analyzing the emotional prosody in the training data and for controlling the emotional output in the generated audio.

There may be several different approaches for training a voice emotionalization ML model that modifies emotional prosody. The core idea is to build a model that can modify or synthesize speech audio based on specific prosodic inputs.

A first way to train a voice emotionalization ML model is to use a text-to-speech (TTS) model with prosody control capabilities. Modern speech synthesis models (e.g., based on neural networks) can generate highly natural-sounding speech and can be trained to modify prosody using explicit prosodic inputs. For these types of models, the training pipeline consists of an input of driving instruction text and prosody parameters (e.g., high pitch, fast speed, high intensity for urgency) and the output would be audio waveform of the driving instructions that are emotionalized based on the input parameters. The emotionalization ML module 216 may use a loss function utilizing a combination of Mel-spectrogram loss for comparing predicted and ground truth audio spectrograms, and prosody loss for comparing predicted and target prosody features like pitch, intensity, etc.

A second way to train the voice emotionalization ML model to modify an existing recording rather than generating a completely new voice is to use a voice conversion (VC) model. These VC models transform an input voice recording into a version with different prosodic characteristics. As an example, a Variational Autoencoders (VAEs) or CycleGAN-based models can be used to modify the prosody of an existing audio file while preserving the original content. This approach modifies an unemotional voice recording based on the desired emotional prosody features. As another example, a specialized Prosody-VAE may disentangle prosody features from the content of speech. This approach may modify the pitch, intensity, and speech rate of an existing recording by providing target prosody parameters. For these types of models, the training pipeline consists of inputting a neural audio and target prosody parameters and outputting an emotionalized audio (e.g., same content as input but with modified prosody). The emotionalization ML module 216 may use a loss function for ensuring the content remains the same and prosody loss to make sure the desired emotional prosody features are learned.

During inference, modifying prosody features such as pitch, seed, and intensity, the trained voice emotionalization ML model may generate driving instructions that are not only contextually appropriate, but also emotionally aligned with the driving situation (e.g., urgent or calm).

The computing device 203 may execute a server interface module 218 configured to allow the AI driving assistant 102 to interface with one or more servers 105 via wireless communication over a data network. The data network can include wired and wireless connections and/or couplings. Accordingly, server interface module 218 can be configured to communicate via a wireless network interface of AI driving assistant 102.

In some aspects, the computing device 203 may execute an optional smartphone interface module 220 can be configured to provide AI driving assistant 102 with communication to a smartphone and/or other personal computing device (e.g., one or more of a tablet and proprietary device). Optional smartphone interface module allows for interfacing with a smartphone that can be used to modify one or more parameters, volume, tone, and/or other parameters described herein, according to driver preferences.

In some aspects, the computing device 203 may execute an optional vehicle interface module 222 can be configured to provide AI driving assistant 102 with communication to an integrated vehicle system. In various aspects this can allow for interfacing with vehicle sensors and/or systems that provide various functions described herein.

It should be noted that the generation of driving instructions and corresponding emotional prosody parameters and modification of the driving instructions based on the emotional prosody parameters is heavily simplified. One of skilled in the art will appreciate that the machine learning models utilized may have significantly large datasets with highly specific details. For example, there may be hundreds of parameters analyzed per second. The analysis would be beyond the capabilities of the human mind because the amount of data to be identified and analyzed in each minute is unfathomable.

Figure 2B:
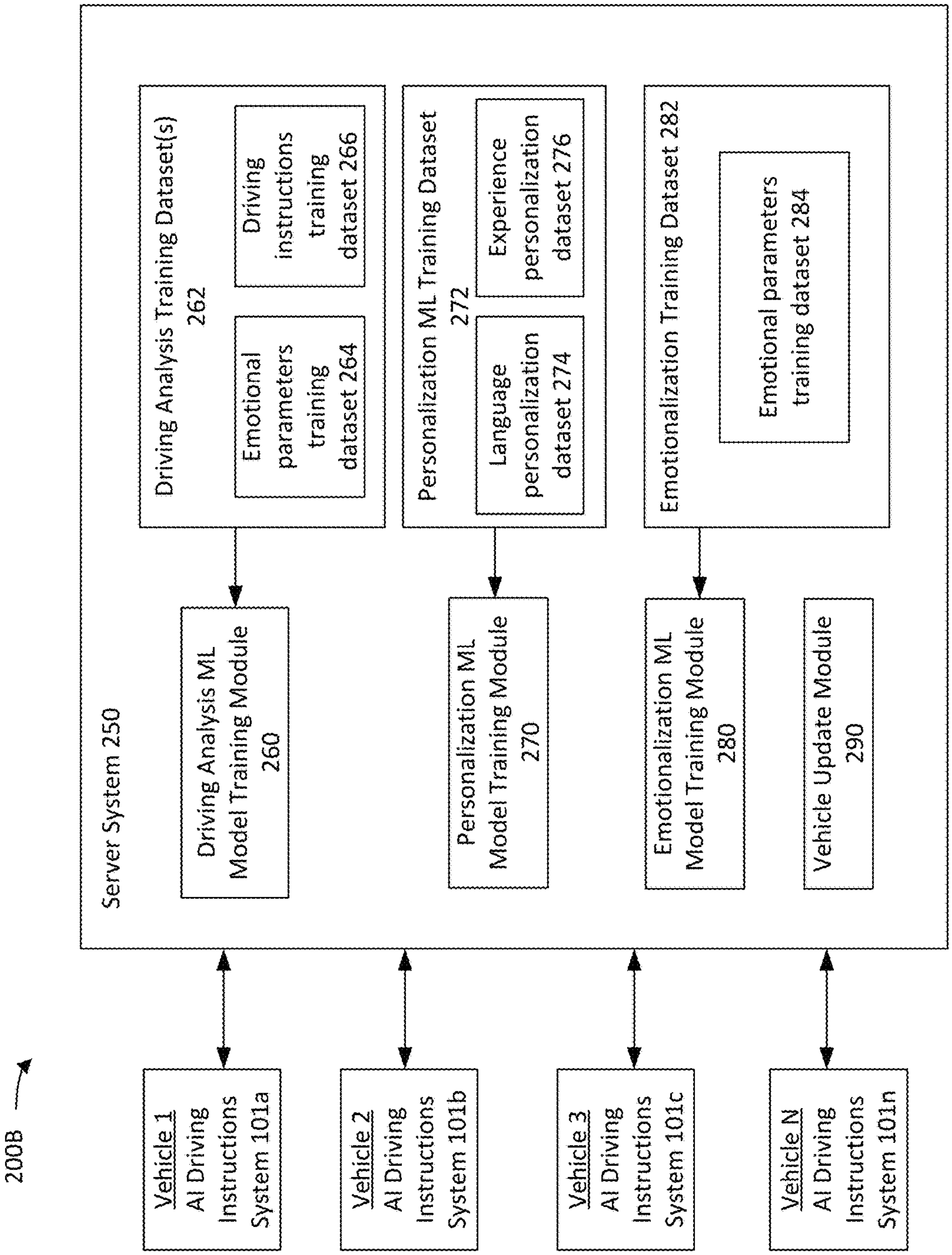
FIG. 2B is a block diagram illustrating a server system for an AI driving instructions system.

FIG. 2B is a block diagram 200B illustrating a server system 250 for an AI driving instructions system. In various aspects server system 250 can be communicatively coupled (e.g., via wireless connection and/or coupling over a data network) with one or more AI driving instructions system(s) (e.g., vehicle 1 AI driving instructions system 101*a*, vehicle 2 AI driving instructions system 101*b*, vehicle 3 AI driving instructions system 101*c*, and/or vehicle N AI driving instructions system 101*n*).

Server system 250 can include a driving analysis ML model training module 260, a personalization ML model training module 270, an emotionalization ML model training module 280, and a vehicle update module 290. Server system can also include one or more driving analysis training dataset(s) 262, which can include one or more emotional parameters training dataset 264 and/or driving instructions training dataset 266; a personalization ML training dataset 272, which can include a language personalization dataset 274 and/or experience personalization dataset 276, and an emotionalization training dataset 282, which can include an emotional parameters training dataset 284.

A driving analysis ML model training module 260 can train a driving analysis ML model using data received from driving analysis training dataset(s) 262. Driving analysis training dataset(s) 262 can include one or more of emotional parameters training dataset 264 and driving instructions training dataset 266.

A personalization ML model training module 270 can train a personalization ML model using data received from a personalization ML training dataset 272. The personalization ML training dataset 272 can include one or more of a language personalization dataset 274 and/or experience personalization dataset 276 (e.g., including driver experience level data).

An emotionalization ML model training module 280 can train an emotionalization ML model using data received from an emotionalization training dataset 282. Emotionalization training dataset 282 can include an emotional parameters training dataset 284.

A vehicle update module 290 can be configured to update one or more vehicle parameters.

Figure 3:
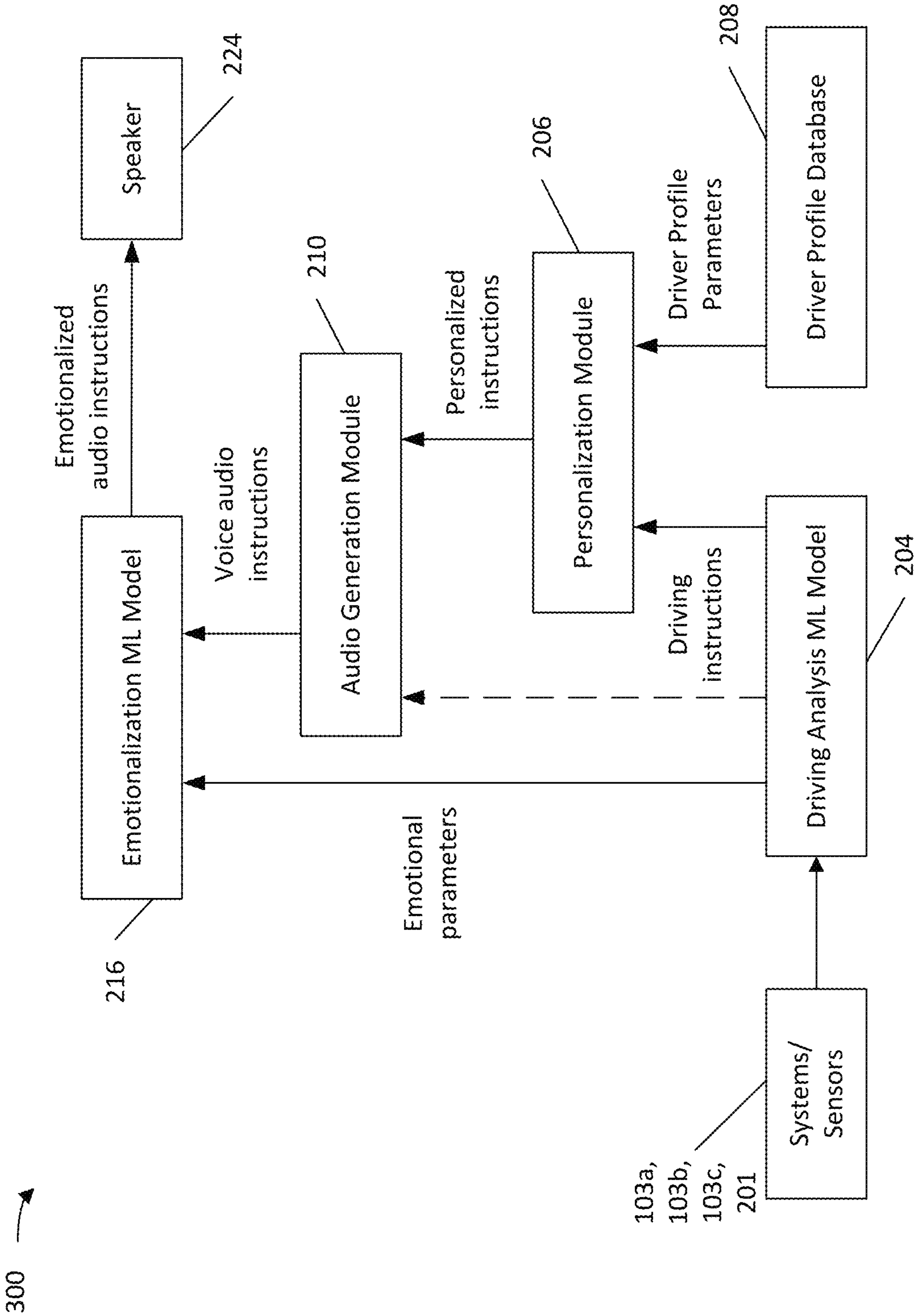
FIG. 3 illustrates a flow diagram of a method for providing personalized driving instructions.

FIG. 3 illustrates a flow diagram 300 of a method for providing personalized driving instructions. According to various aspects, vehicle systems and/or sensors 103*a*, 103*b*, 103*c*, and/or 201 can provide data to a driving analysis ML module 204. Driving analysis ML module 204 can acquire a plurality of parameters from the vehicle systems and/or sensors 103*a*, 103*b*, 103*c*, and/or 201, analyze the acquired parameters and generate and output driving instructions to a personalization module 206. A personalization module 206 can access a driver profile database 208 for driver profile parameters. The personalization module 206 can acquire and/or receive driving instructions from driving analysis ML module 204 and driver profile parameters from driver profile database 208 and provide personalized instructions to an audio generation module 210. Optionally, audio generation module 210 can acquire and/or receive driving instructions from driving analysis ML module 204. Audio generation module 210 can provide voice audio instructions to an emotionalization ML module 216. Emotionalization ML module 216 can also receive and/or acquire emotional prosody parameters from driving analysis ML module 204.

Emotionalization ML module 216 can send emotionalized audio instructions to one or more speakers 224 for audible output to a vehicle operator. In some aspects, the one or more speakers 224 can be vehicle speakers. In some aspects the one or more speakers 224 can be smartphone and/or proprietary device speakers.

In some aspects, a plurality of parameters acquired by driving analysis ML model from vehicle systems and/or sensors 103*a*, 103*b*, 103*c*, and/or 201 can include a plurality of vehicle control parameters from at least one vehicle control system, a plurality of vehicle navigation parameters from at least one vehicle navigation system, a plurality of road condition parameters from a plurality of vehicle road sensors, and a plurality of driver condition parameters from one or more driver sensors, and weather conditions and/or road reports from other external sources. In some aspects, the other external sources may include data streams from race organizers in cases where the vehicle is involved in a race.

In some aspects, driving analysis ML module 204 includes one or more of Classification models, Regression models, and Time Delay Neural Networks (TDNNs).

Classification models are a type of predictive modeling that organizes data into predefined classes according to feature values. In other words, it is a type of ML modeling that divides data points into predefined groups (classes) and learns class characteristics from the input data and assigns possible classes to new data using learned characteristics.

Generally, the key steps for using classification models on driving data include collecting relevant raw data from the environment monitoring sensors 103*a*, driving monitoring sensors 103*b*, vehicle control sensors 103*c*, and/or online RTWIS 201, extracting meaningful features from the raw data, defining the classes for prediction (e.g., safe driving v. unsafe driving, or low-risk trip vs. high risk trip), using a classification algorithm (e.g., decision trees, support vector machines, or neural networks) to train the model on labeled data, and applying the model to new driving data to predict a particular classification.

In the context of analyzing driving data, classification models may be highly useful for a variety of data analysis in different contexts. Classification models can be used to analyze driving behavior by categorizing different driving styles into predefined groups based on data captured from the environment monitoring sensors 103*a*, driving monitoring sensors 103*b*, vehicle control sensors 103*c*, and/or online RTWIS 201. For example, the classification model may classify a driver's style as aggressive, cautious, or normal based on features like speed patterns (e.g., average speed, acceleration, braking frequency), lane changes, following distance, and/or steering patterns, and generate driving instructions for the driver of the vehicle and corresponding emotional prosody parameters based on the classified driving style.

As another example, classification models may use historical driving data and accident records to predict whether a particular trip or driver profile is at high or low risk leading to an accident. Features may include time of day, weather conditions, road type, driver fatigue. Once the model is trained, the model may classify new trips into categories like safe, moderate risk, or high-risk and, accordingly, generate driving instructions for the driver of the vehicle and corresponding emotional prosody parameters based on the risk classification.

Regression models investigate the relationship between independent variables or features and dependent variables or outcomes. Regression models are a type of supervised learning where the true value of each data is provided during the training process. Regression modeling can be used to predict continuous outcomes. Regression models may be widely used to analyze driving data to understand and predict various aspects of driving behavior, vehicle performance, and environmental factors.

In the context of analyzing driving data, regression models are a powerful tool in predictive modeling, particularly in the context of predicting continuous numerical outcomes. For example, regression models may help predict variables like likelihood of a future accident, travel time, or fuel consumption based on various features of the driving data. The first step in using regression models is defining a prediction task (e.g., target variable). For driving data, this may include fuel consumption, travel time, or probability of an accident happening on a trip. Next, relevant data is collected from the various sensors for building an accurate regression model. New features may be created from the driving data to better represent the data or capture relationships between variables. The goal is to create features that improve the model's ability to predict the target variable accurately.

Before training the regression model, the dataset may be split into training and test sets to evaluate its performance. For example, 70% of the data may be used for training and 30% may be used for testing to ensure that the model is evaluated on unseen data to prevent overfitting. A regression model may be chosen depending on the nature of the problem. The different regression models may include linear regression, polynomial regression, ridge or lasso regression, decision trees or random forests, or gradient boosting models. The chosen regression model is then trained using a training set to find the optimal relationship between the input features and the target variable by minimizing a loss function (e.g., mean squared error, mean absolute error, etc.).

Once the regression model is trained, the regression model is evaluated using the test set. If the model performs poorly on the test set, then the hyperparameters may need to be tuned, more features may be added, or a different regression model may be used. When the model achieves satisfactory performance, the regression model may be deployed for real-time predictions on new driving data.

As an example, regression models may be used to analyze driver behavior by understanding how driver behaviors (e.g., braking, accelerating, lane changing) affect overall driving performance or safety. The independent variables may include acceleration rate, braking force, distance to the vehicle in front, reaction times, etc. Dependent variables may include severity of accidents, driving smoothness score, etc. By mapping these variables to the outcome, regression models can predict the likelihood of incidents or evaluate the safety profile of different drivers. In this way, driving instructions for the driver of the vehicle and corresponding emotional prosody parameters may be generated based on the likelihood of incidents or predicted safety profiles.

As another example, a regression model may predict the likelihood of accidents based on certain driving conditions predicted by the various sensors. The independent variables may include weather conditions, road surface conditions, driver speed, visibility, or traffic volume. The dependent variables may include probability of accidents or accident severity (e.g., continuous value or score). The regression model may help analyze how different factors contribute to the risk of an accident, providing another data point for generating driving instructions for the driver of the vehicle and corresponding emotional prosody parameters based on the risk classification for accidents.

TDNNs are multilayer artificial neural networks that classify patterns with shift-invariance and model context at each layer of the network. In shift-invariant classification, the classifier does not require explicit segmentation prior to classification. For speech, which is a temporal pattern, TDNNs avoid having to determine the beginning and end points of sounds before classifying them. In contextual modeling using a TDNN, each neural unit at each layer receives inputs from activations and/or feature at a layer below and from a pattern of unit output and its context. For time signals, each unit receives inputs from activation patterns over time from units below. When applied to two-dimensional classification for images and/or time frequency patterns, TDNNs can be trained with shift-invariance in coordinate space and avoid precise segmentation in such space.

When applied to driving data, TDNNs can be highly effective in analyzing time-based signals (e.g., speed, acceleration, barking patterns) and other sequential data without needing to precisely segment those segments into defined start and end points. Since driving is inherently a time-dependent activity where behaviors occur in a continuous flow, TDNNs are highly effective in analyzing sequences of data (such as speed changes, steering angles, or braking intensity) and classifying these patterns into predefined driver behavior such as safe driving vs. aggressive driving without needing to precisely determine the start or end of each action. Because of their innate ability to model temporal patterns, TDNNs can also learn the context in which these behaviors occur (e.g., sudden deceleration followed by a sharp turn) and classify the driving style based on the overall pattern.

As an example, a TDNN can be trained on time-series data from the vehicle sensors to classify driving sessions into behaviors such as normal driving, aggressive driving, or distracted driving. TDNNs can model complex sequences without having to segment each individual action such as braking of accelerating. Instead, TDNNs can analyze patterns over a window of time and make predictions about accident risk based on the temporal relationships between different driving actions. For instance, a TDNN can take time-series data from accelerometers, speed sensors, and cameras to predict high-risk driving moments such as when a combination of factors like sharp braking following by hard acceleration indicates a high likelihood of an accident. As another example, TDNN can identify when a driver may be drowsy or detect fatigue (e.g., their control of the vehicle becomes less consistent) by analyzing the patterns in steering input or lane-keeping behavior over time.

In some aspects, voice emotionalization ML module 216 can include one or more of: Generative Adversarial Networks (GANs), Variational Autoencoders (VAEs), Sequence-to-Sequence models. Specific details about how the voice emotionalization ML models are trained and utilized are described above.

A GAN comprises a generator and a discriminator trained simultaneously through adversarial training. The generator aims to generate realistic data, while the discriminator tries to distinguish between real and generated data. A GAN is widely used for image and content generation tasks.

A VAE comprises an encoder that maps each point from a dataset into a distribution in a latent space, rather than a single point in that space. By mapping in this fashion, the network can avoid overfitting the training data. Both networks can be trained together using the reparameterization trick and can be used in unsupervised, semi-supervised, and supervised learning.

A Sequence-to-Sequence model comprises sequence transformation whereby it turns one sequence into another sequence. It performs this by mapping an input sequence into a real-numerical vector by a neural network (encoder) and mapping it back to an output sequence using another neural network (decoder).

In some aspects, personalized instructions generated by a personalization module 206 can be personalized based on one or mor driver profile parameters including age, accent spoken language, disability, and driving experience. In some examples, personalized instructions may be generated based on accent parameters that refer to specific features and characteristics that define how a particular driver's accent sound. As a non-limiting example, the accent parameters may include: phonetic features, intonation, rhythm/stress, vowel length, consonant clusters, prosody, and/or lexical features.

Figure 4:
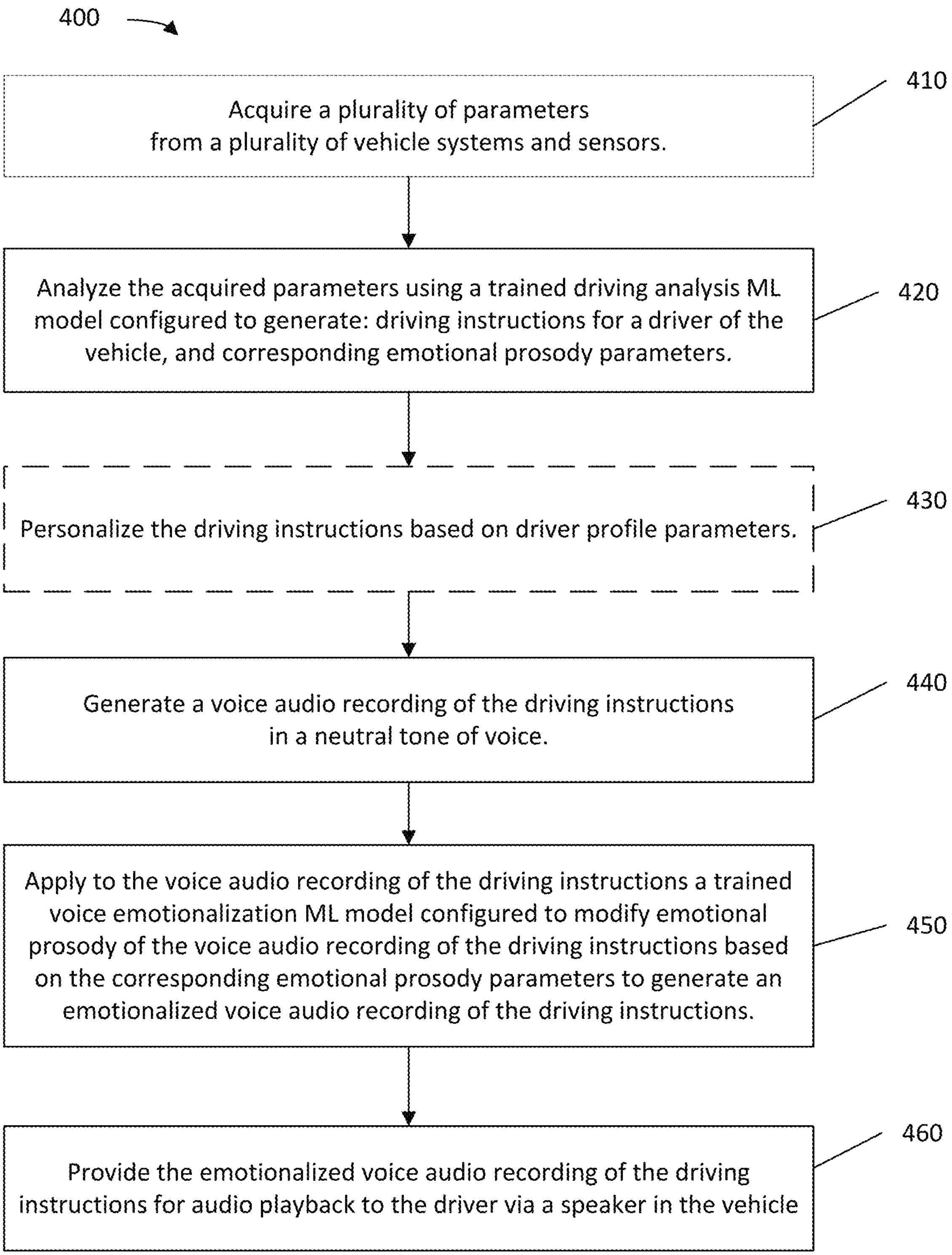
FIG. 4 illustrates a flow diagram of a method for providing personalized driving instructions.

FIG. 4 illustrates a flow diagram 400 of a method for providing personalized driving instructions. In block 410, the method includes acquiring a plurality of parameters from a plurality of vehicle systems and sensors. In block 420, the method includes analyzing the acquired parameters using a trained driving analysis ML model configured to generate driving instructions for a driver of the vehicle, and corresponding emotional prosody parameters. In block 430, which can be optional, the method can include personalizing the driving instructions based on driver profile parameters. In block 440, the method can include generating a voice audio recording of the driving instructions in a neutral tone of voice. In block 450, the method can include applying to the voice audio recording of the driving instructions a trained voice emotionalization ML model configured to modify emotional prosody of the voice audio recording of the driving instructions based on the corresponding emotional prosody parameters to generate an emotionalized voice audio recording of the driving instructions. In some aspects, the emotionalized voice audio recording may be generated with spatial features (e.g., change location and/or direction of audio playback) such that spatial audio is utilized to "position" the audio source. In block 460, the method can include providing the emotionalized voice audio recording of the driving instructions for audio playback to the driver via a speaker of the vehicle.

Personalizing the driving instruction by the personalization module 206 can include fine-tuning the driving analysis ML model to modify the driving instructions based on one or more driver profile parameters to generate personalized driving instructions or applying to the driving instructions a trained personalization ML model configured to modify the driving instructions based on one or more driver profile parameters. The personalization module 206 can include a model that includes one or more machine learning architectures selected from a group including: Classification models (classify drivers based on experience level), Generative adversarial networks (GANs)—personalized speech patterns, Rule-based systems enhanced with machine learning (adjusting tone and complexity based on the driver's experience level), Transformer models: consider age, language preference, accent, and disability status simultaneously to generate personalized instruction, Meta-learning models: effectively personalize instructions for drivers with unique profile parameters, Regression models, Recurrent neural networks (RNNs), and Long short-term memory (LSTM) networks. In various aspects, models may be executed sequentially.

A transformer is a deep learning architecture used in large language models (LLMs). The transformer has an encoder/ decoder structure with numerous stacked multi-head attention layers and feed forward network layers. This architecture allows the model to process and generate text effectively, capturing long-range dependencies and contextual information. Transformer are well-suited for tasks like natural language processing, and image classification and generation. Common examples of transformer models are generative pre-trained transformer (GPT) and Bidirectional Encoder Representations from Transformers (BERT).

Emotional prosody parameters can include at least pitch, loudness, timbre, speech rate, and/or pauses. As an illustrative example, each of the prosody parameters may have a respective value range corresponding with a level of urgency. The principle is that a human brain is wired to associate higher-pitched sounds, louder sounds, bright timbres, or the like with immediacy, danger, or the need for a quick reaction. These elements work together to convey emotional intensity, stress, or the need for immediate action.

For example, for pitch refers to a perceived highness or lowness of a voice, determined by the frequency of vocal cord vibrations which are measured in Hertz (Hz). A certain pitch may play a significant role in conveying the urgency of a message. Generally, when a message is more urgent, the speaker's pitch tends to increase due to both physiological and psychological factors. As such, an increased pitch often indicates heightened emotion, stress, or excitement. When people are in a state of urgency or panic, people unconsciously raise the pitch of their voice because the muscles around the vocal cords tighten during stress, causing the vocal cords to vibrate faster resulting in a higher pitch. Accordingly, a calm person may have a lower-pitched voice when giving routine instructions (e.g., not urgent), with the higher-pitched, faster speech of someone issuing a warning such as "Watch out!" or "Hurry!" As an example, calm speech may have a frequency range of around 120-200 Hz and urgent speech may reach 250-500 Hz.

In addition, urgent messages are often accompanied by rapid pitch changes or pitch spikes (e.g., pitch modulation). These rapid fluctuations in pitch grab attention and signal that the information being conveyed requires immediate attention. A flat pitch (e.g., monotone) is associated with non-urgent, neural messages, while dynamic pitch changes can signal rising urgency.

Loudness refers to the intensity or volume of sound and is typically measured in decibels (dB). A soft voice may be associated with messages of low urgency, a normal voice may be associated with message of neutral urgency, and a loud voice may be associated with messages of high urgency. The loudness of a message may raise the intensity and direct the attention of the listener to critical moments.

Speech rate is typically measured in words per minute (WPM). Generally, a faster speech rate indicates urgency because a speaker wants to communicate the message quickly to get an immediate attention or action. As such, a fast speech rate may indicate an urgent or stressful situation for a high urgency message such as warnings or alarms. A slow speech rate may indicate a calm situation for a neural or low urgency message. The slower speech allows the listener to process information more carefully, which is why it's often used in a non-urgent context. In some aspects, instructions may have variable speech rates (alternative fast and slow) to add drama and help prioritize different elements within the message, enhancing the impact of both urgency and importance. By adjusting the speech rate along with other prosodic elements like pitch, loudness, and pauses, speakers can effectively signal how urgent or how critical a message is.

Timbre (e.g., quality) refers to the quality or "color" of the sound, distinguishing different voices of tones. While pitch and loudness tend to be more directly linked to urgency, changes in timbre can enhance or modify the perception of urgency by adding emotional or tonal cues to speech. As an example, a bright timbre is characterized by a clear, sharp and high-frequency sound, which makes the voice sound crisp and penetrating. A speaker raising their voice with a bright timbre when saying "watch out!" or "Fire!" gives the impression that immediate action is needed since the bright timbre is more noticeable and likely to be perceived as a call for immediate attention. In addition, a harsh timbre is rough, abrasive, and is often associated with strained vocal production. Harsh timbre can be a strong indicator of distress, stress, or frustration, which heightens the perception of urgency. For example, when someone shouts in a harsh voice "Get out now!", the harshness adds to the sense of immediate threat and danger, which creates a visceral reaction in the listener. By contrast, a warm timbre is characterized by a fuller, more balanced sound and has less emphasis on high frequencies and more on the mid-to-low range to give it a soft, soothing and comforting quality. Accordingly, a speaker with a warm timbre is perceived calming or reassuring and may be appropriate for neutral or low urgency instructions.

In some aspects, timbre does not work in isolation, but combined with other prosodic features such as pitch, loudness, and speech rate to shape how urgent a message should feel. As a first example, a bright, high-pitched, and loud voice is the most typical combination for highly urgent messages. A warm, moderately loud and fast voice may indicate controlled urgency, such as giving an important instruction in a serious but calm tone for a neural message. A warm, soft, and slow voice may indicate low urgency for giving a low urgency message such as "Fuel Tank is at 50%" or "Replace Wiper Fluids Soon."

Pauses are an important prosodic feature in speech that play a critical role in conveying the urgency of a message. The way pauses are used—both their duration and frequency—can significantly affect how the listener perceives the emotional tone and level of urgency. Shorter pauses signal higher urgency because speakers tend to reduce the length of pauses or skip them entirely in order to increase pressure on the listener to act or pay attention. For example, in an emergency, someone shouting "Hurry! Turn left now, there is a car approaching the right side" would likely use very few, short pauses, signaling the need for immediate action. By contrast, long pauses (e.g., more than 1-2 seconds) are typically associated with a slower pace and more thoughtful speech for less urgent messages. When speakers pause between sentences or ideas, it gives the impression that the situation is calm or allows time for reflection, reducing the sense of urgency.

| | Pitch | Loudness | Timber | Speech rate | Pause |
|---|---|---|---|---|---|
| High Urgency | 250-500 Hz | Over 100 dB | High, or Harsh | 180-250 WPM | 200-500 ms |
| Neutral | 150-250 Hz | 60-70 dB | Warm | 150-180 WPM | 1-2 seconds or longer |
| Low Urgency | 75-150 Hz | 30-34 dB | Warm | 100-130 WPM | 1-2 seconds or longer |

It should be noted that the specific emotional prosody parameters and range of values corresponding to a level of urgency of instructions is for illustrative purposes only. One of ordinary skill in the art will understand that any appropriate emotional prosody parameters and respective ranges that correlate with a level of urgency of instructions may be used in the present disclosure.

Generating a voice audio recording of driving instructions can include one or more of converting the driving instructions into audio using a voice synthesizer and selecting a pre-recorded voice audio clip corresponding to the driving instructions from a database of pre-recorded voice audio clips.

Training the voice emotionalization ML model, can include providing to the voice emotionalization ML model a training dataset including a plurality of pre-recorded emotionalized voice audio recordings of driving instructions corresponding to different driving conditions and environments, and corresponding prosody parameters for each audio recording; and the same pre-recorded audio recordings of driving instructions in a neutral-tone voice, and corresponding prosody parameters set at the base level, and training the voice emotionalization ML model using the provided training dataset.

Figure 5A:
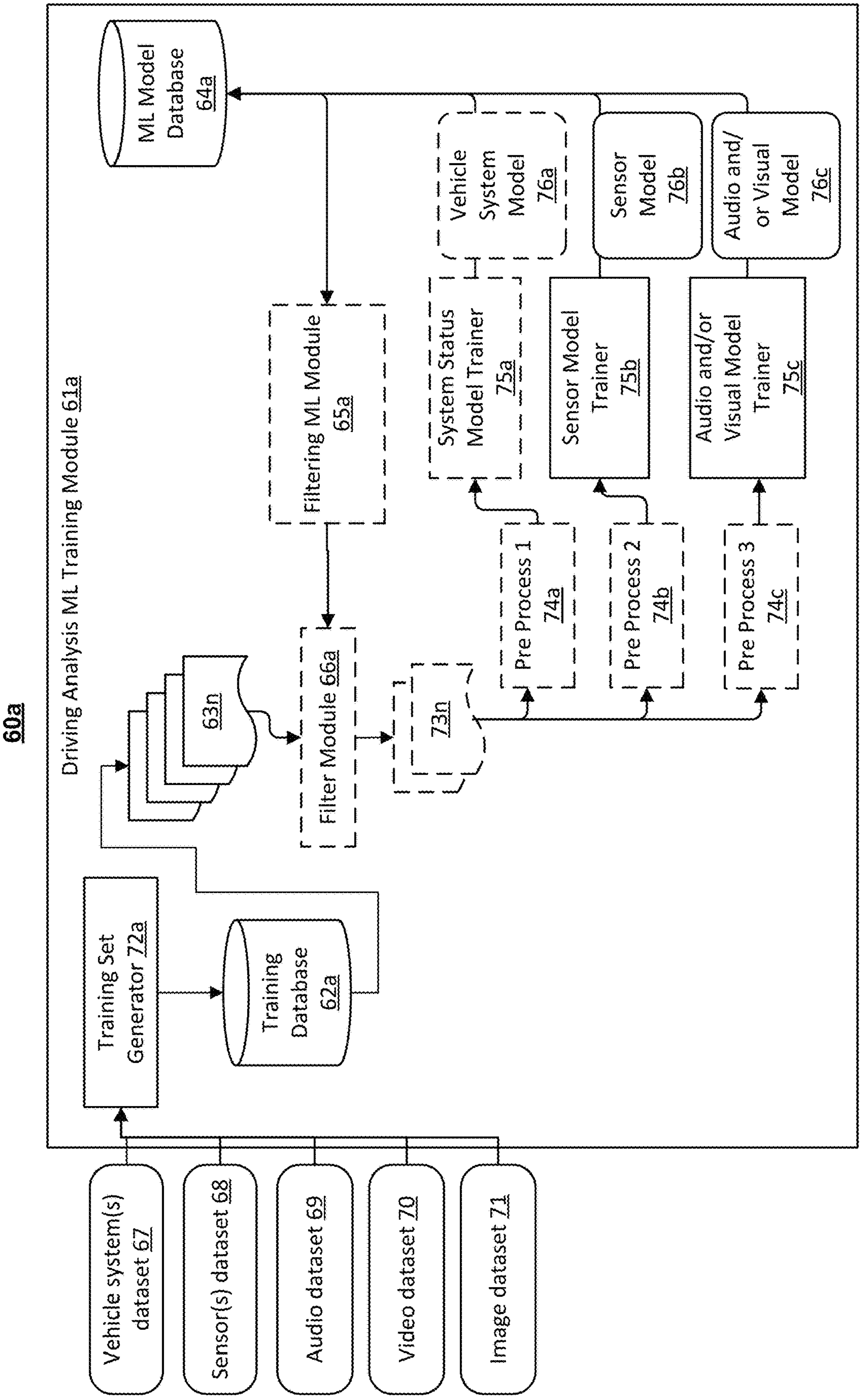
FIG. 5A is a block diagram illustrating a system for training machine learning models to personalize driving instructions according to aspects of the present disclosure.

FIG. 5A is a block diagram 60*a* illustrating a system for training machine learning models to personalize driving instructions according to aspects of the present disclosure. As shown in example 60*a*, a driving analysis ML training module 61*a* is configured to build and train specialized machine learning models with inference to perform particular tasks. This enables the specialized machine learning models to develop an ability to perform particular objectives on inputs that are not part of a training dataset. By subjecting the specialized machine learning models to large amounts of unlabeled and/or labeled trained data sets, the specialized machine learning models may perform particular tasks such as analyzing data from vehicle systems and/or sensors to generate emotional parameters and/or driving instructions, analyzing driving instructions and/or driver profile parameters to generate personalized instructions, and analyzing emotional parameters and/or voice audio instructions to generate emotionalized audio instructions. Examples of unlabeled and/or labeled trained data sets can include one or more of vehicle system(s) dataset 67, sensor(s) dataset 68, audio dataset 69, video dataset 70, and/or image data set 71.

Supervised learning is effective for tasks such as classification (assigning inputs to predefined categories) and regression (predicting continuous values) since it relies on the availability of labeled data for both training and evaluation phases. In supervised learning, the driving analysis ML training module 61*a* trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, the driving analysis ML training module 61*a* provides the algorithm with a training dataset including input-output pairs. The algorithm learns the mapping function that relates inputs to outputs through an iterative process, adjusting its internal parameters based on the provided examples. During model building, the algorithm creates a model that can generalize from the training data to make predictions on new, unseen data. The model's complexity varies based on the algorithm used. For example, the model may be a simple linear regression model or a complex neural network. During the prediction phase, the driving analysis ML training module 61*a* inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, machine refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

In some aspects, the driving analysis ML training module 61*a* includes at least a training database 62*a* configured to store the raw training data 63*n* and corresponding labels, a ML model database 64*a* to store the trained models (e.g., models 76*a*, 76*b*, 76*c*). In some aspects, the driving analysis ML training module 61*a* may include a filtering machine learning model 65*a* and a filter module 66*a* configured to filter data from the training database 62*a* for training by removing poorly generated training data.

Training data from the vehicle system(s) dataset 67, sensor(s) dataset 68, audio training dataset 69, video dataset 70, and image dataset 71 is received into the driving analysis ML training module 61*a* via the training set generator 72*a*. In some aspects, vehicle system(s) dataset 67 includes data captured by one or more vehicle systems, sensor(s) dataset 68 includes data from one or more vehicle sensors, audio training dataset 69 includes audio data recorded by one or more audio recording devices such as microphones and audio transducers, video dataset 70 includes videos recorded by one or more video recording devices such as video cameras, and image dataset 71 includes images captured by one or more cameras. Examples of data in the vehicle system(s) dataset 67 can include one or more of vehicle function data and vehicle status data and can be captured by vehicle control sensors 103*c*. Examples of data in sensor(s) dataset 68 can include data recorded by one or more vehicle sensors, including environmental monitoring sensors 103*a*. Driver monitoring sensors 103*b* can capture audio, video, and/or images of a driver via one or more audio, visual, and/or audiovisual recording devices and/or components.

An optional filter module 66 is configured to filter out bad, poor, and/or corrupt training audio recordings, video recordings, images, and/or data in order to clean up or otherwise ensure integrity of the training data in the training dataset 63*n*. In some examples, the filter module 66*a* may be a neural network. In some examples, the filter module 66*a* is a mathematical model. In some examples, the cleaned training dataset 73*n* then undergoes optional preprocessing steps depending on which neural network or model is being trained.

The optional preprocess 1 74*a*, preprocess 2 74*b*, and preprocess 3 74*c* are automated processes that modify the raw data received from 63*n* (or cleaned training dataset 73*n*) and prepare the raw data as input to the respective model trainers (e.g., a system status model trainer 75*a*, a sensor model trainer 75*b*, and an audio and/or visual model trainer 75*c*). These may be described in the machine learning training module 61 as snippets of code that prepares the datasets. In some examples, the preprocessing module (e.g., preprocess 1 74*a*, preprocess 2 74*b*, and preprocess 3 74*c*) for a particular trainer may be an automated script or code that will be setup the first time any model is trained.

The system status model trainer 75*a*, sensor model trainer 75*b*, and audio and/or visual model trainer 75*c* are the scripts or code that train the model. The system status model trainer 75*a*, sensor model trainer 75*b*, and audio and/or visual model trainer 75*c* may be a script or code that holds the instructions on how a model should be trained (e.g., optimization method, model architecture, dataset division, etc.) and also runs the training. The system status model trainer 75*a*, sensor model trainer 75*b*, and audio and/or visual model trainer 75*c* each take as input the raw or filtered processed training data and train vehicle system model 76*a*, sensor model 76*b*, and audio and/or visual model 76*c* to achieve their specific objectives, respectively.

In summary, the raw dataset 63*n* or cleaned dataset 73*n* may optionally go through different preprocessing steps 74*a*, 74*b*, and 74*c* and then a corresponding system status model trainer 75*a*, sensor model trainer 75*b*, and audio and/or visual model trainer 75*c* to generate a trained vehicle system detection model 76*a*, a trained sensor model 76*b*, and a trained audio and/or visual model 76*c*. In some examples, each of these models may be a neural network.

As a non-limiting example, the machine learning may be a neural network. The neural network models are designed using a set of hyperparameters that define high-level aspects of their architecture and training process. These hyperparameters include, but are not limited to a combination of architecture type, number of layers, memory size, number of attention heads, learning rate, batch size, optimization algorithm, and the like. Based on these hyperparameters, learnable variables called parameters are initialized, which define the mathematical function that the neural network represents.

The raw training dataset 63*n* used for training may include noise and bad training data, audio, video, and/or images from the training database 62*a*. Accordingly, to create a clean and filtered training dataset, the filter module 66*a* is configured to filter out unwanted data points from the raw training dataset 63*n* by developing smaller, less accurate systems based on patterns and metadata information.

During the training process, system status model trainer 75*a*, sensor model trainer 75*b*, and audio and/or visual model trainer 75*c* (e.g., neural networks) are presented with input data and labels of actual values, and the optimization objective, which aims to minimize the difference between the actual value and the predicted value, is calculated. The optimization algorithm updates the parameters of system status model trainer 75*a*, sensor model trainer 75*b*, and audio and/or visual model trainer 75*c* to reduce the value of the objective. This process is repeated for several iterations until the parameters do not change anymore. This process is repeated for various combinations of hyperparameters, and the model with the smallest label prediction error is selected as the final model.

When a new model (e.g., a trained vehicle system model 76*a*, a trained sensor model 76*b*, and a trained audio and/or visual model 76*c*) is created, and a new process for filtering and automated labeling is established, it is added to the ML model database 64 in the ML training module 61*a*. This enables the new model to be part of the closed-loop model update process. Optionally, at regular intervals, data which is continuously collected can be filtered, labeled, and used to update old models by an optional filtering machine learning module 65*a*. In some examples, the filtering machine learning module 65*a* is a neural network. In some examples, the filtering machine learning module 65*a* is a mathematical model. This approach may capture changes in the data over time.

In some aspects, training a driving analysis ML model can include providing to the driving analysis ML module 204 a training dataset including: a plurality of training parameters indicating different driving conditions and environments, including: vehicle control parameters, vehicle navigation parameters, road condition parameters, and/or driver condition parameters; predetermined driving instructions, corresponding to the plurality of training parameters, indicating recommended driving actions for a driver of the vehicle to assure safe operation of the vehicle and/or to avoid driving accidents; and predetermined emotional prosody parameters, corresponding to the driving instructions, indicating a preferred emotional prosody of playback of the driving instructions to the driver in order to impart a required level of urgency and/or level of importance to the driving instructions; and training the driving analysis ML module 204 using the provided training dataset.

Figure 5B:
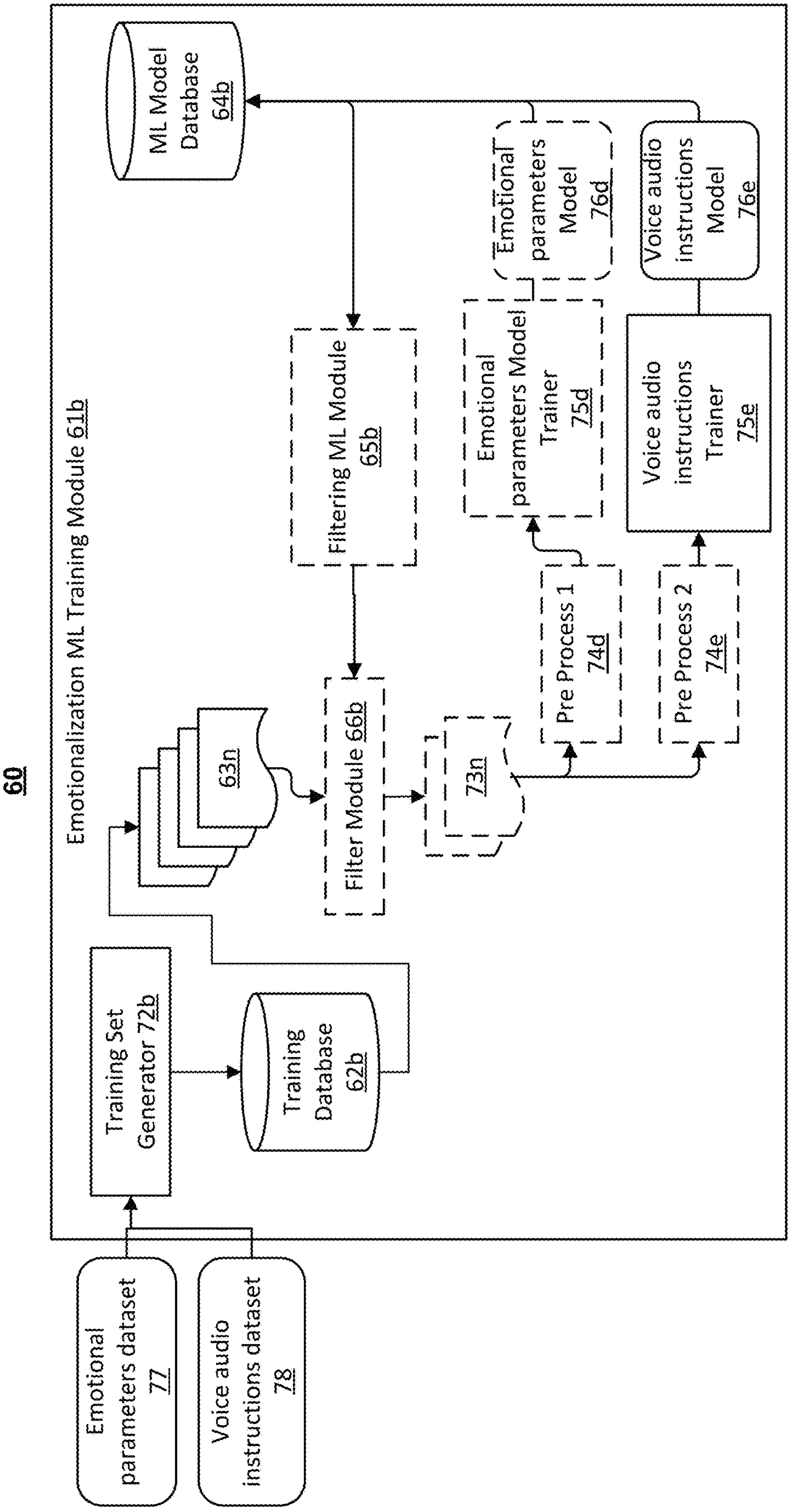
FIG. 5B is a block diagram illustrating a system for training machine learning models to personalize driving instructions according to aspects of the present disclosure.

FIG. 5B is a block diagram 60*b* illustrating a system for training machine learning models to personalize driving instructions according to aspects of the present disclosure. As shown in example 60*b*, an emotionalization ML training module 61*b* is configured to build and train specialized machine learning models with inference to perform particular tasks. This enables the specialized machine learning models to develop an ability to perform particular objectives on inputs that are not part of a training dataset. By subjecting the specialized machine learning models to large amounts of unlabeled and/or labeled trained data sets, the specialized machine learning models may perform particular tasks such as analyzing data from vehicle systems and/or sensors to generate emotional parameters and/or driving instructions, analyzing driving instructions and/or driver profile parameters to generate personalized instructions, and analyzing emotional parameters and/or voice audio instructions to generate emotionalized audio instructions. Examples of unlabeled and/or labeled trained data sets can include one or more of emotional parameters dataset 77 and/or voice audio instructions dataset 78.

Supervised learning is effective for tasks such as classification (assigning inputs to predefined categories) and regression (predicting continuous values) since it relies on the availability of labeled data for both training and evaluation phases. In supervised learning, the emotionalization ML training module 61*b* trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, the emotionalization ML training module 61*b* provides the algorithm with a training dataset including input-output pairs. The algorithm learns the mapping function that relates inputs to outputs through an iterative process, adjusting its internal parameters based on the provided examples. During model building, the algorithm creates a model that can generalize from the training data to make predictions on new, unseen data. The model's complexity varies based on the algorithm used. For example, the model may be a simple linear regression model or a complex neural network. During the prediction phase, the emotionalization ML training module 61*b* inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, machine refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

In some aspects, the emotionalization ML training module 61*b* includes at least a training database 62*b* configured to store the raw training data 63*n* and corresponding labels, a ML model database 64*b* to store the trained models (e.g., models 76*d*, 76*e*). In some aspects, the emotionalization ML training module 61*b* may include a filtering machine learning model 65*b* and a filter module 66*b* configured to filter data from the training database 62*b* for training by removing poorly generated training data.

Training data from the vehicle system(s) dataset 67, emotional parameters dataset 77 and voice audio instructions dataset 78 is received into the emotionalization ML training module 61*b* via the training set generator 72*b*.

An optional filter module 66*b* is configured to filter out bad, poor, and/or corrupt training audio recordings, video recordings, images, and/or data in order to clean up or otherwise ensure integrity of the training data in the training dataset 63*n*. In some examples, the filter module 66*b* may be a neural network. In some examples, the filter module 66*b* is a mathematical model. In some examples, the cleaned training dataset 73*n* then undergoes optional preprocessing steps depending on which neural network or model is being trained.

The optional preprocess 1 74*d* and preprocess 2 74*e* are automated processes that modify the raw data received from 63*n* (or cleaned training dataset 73*n*) and prepare the raw data as input to the respective model trainers (e.g., an emotional parameters model trainer 75*d* and a voice audio instructions model trainer 75*e*). These may be described in the machine learning training module 61*b* as snippets of code that prepares the datasets. In some examples, the preprocessing module (e.g., preprocess 1 74*d*, preprocess 2 74*e*) for a particular trainer may be an automated script or code that will be setup the first time any model is trained.

The system status model trainer 75*d*, sensor model trainer 75*e* are the scripts or code that train the model. The emotional parameters model trainer 75*d* and voice audio instructions model trainer 75*e* may be a script or code that holds the instructions on how a model should be trained (e.g., optimization method, model architecture, dataset division, etc.) and also runs the training. The emotional parameters model trainer 75*d* and voice audio instructions model trainer 75*e* each take as input the raw or filtered processed training data and train emotional parameters model 76*d* and voice audio instructions model 76*e* to achieve their specific objectives, respectively.

In summary, the raw dataset 63*n* or cleaned dataset 73*n* may optionally go through different preprocessing steps 74*d* and 74*e* and then a corresponding emotional parameters model trainer 75*d* and voice audio instructions model trainer 75*e* to generate a trained emotional parameters model 76*d* and voice audio instructions model 75*e*. In some examples, each of these models may be a neural network.

As a non-limiting example, the machine learning may be a neural network. The neural network models are designed using a set of hyperparameters that define high-level aspects of their architecture and training process. These hyperparameters include, but are not limited to a combination of architecture type, number of layers, memory size, number of attention heads, learning rate, batch size, optimization algorithm, and the like. Based on these hyperparameters, learnable variables called parameters are initialized, which define the mathematical function that the neural network represents.

The raw training dataset 63*n* used for training may include noise and bad training data, audio, video, and/or images from the training database 62*b*. Accordingly, to create a clean and filtered training dataset, the filter module 66*b* is configured to filter out unwanted data points from the raw training dataset 63*n* by developing smaller, less accurate systems based on patterns and metadata information.

During the training process emotional parameters model trainer 75*d* and voice audio instructions model trainer 75*e* (e.g., neural networks) are presented with input data and labels of actual values, and the optimization objective, which aims to minimize the difference between the actual value and the predicted value, is calculated. The optimization algorithm updates the parameters of emotional parameters model trainer 75*d* and voice audio instructions model trainer 75*e* to reduce the value of the objective. This process is repeated for several iterations until the parameters do not change anymore. This process is repeated for various combinations of hyperparameters, and the model with the smallest label prediction error is selected as the final model.

When a new model (e.g., emotional parameters model 76*d* and voice audio instructions model trainer 76*e*) is created, and a new process for filtering and automated labeling is established, it is added to the ML model database 64 in the ML training module 61*b*. This enables the new model to be part of the closed-loop model update process. Optionally, at regular intervals, data which is continuously collected can be filtered, labeled, and used to update old models by an optional filtering machine learning module 65*b*. In some examples, the filtering machine learning module 65*b* is a neural network. In some examples, the filtering machine learning module 65*b* is a mathematical model. This approach may capture changes in the data over time.

Figure 6:
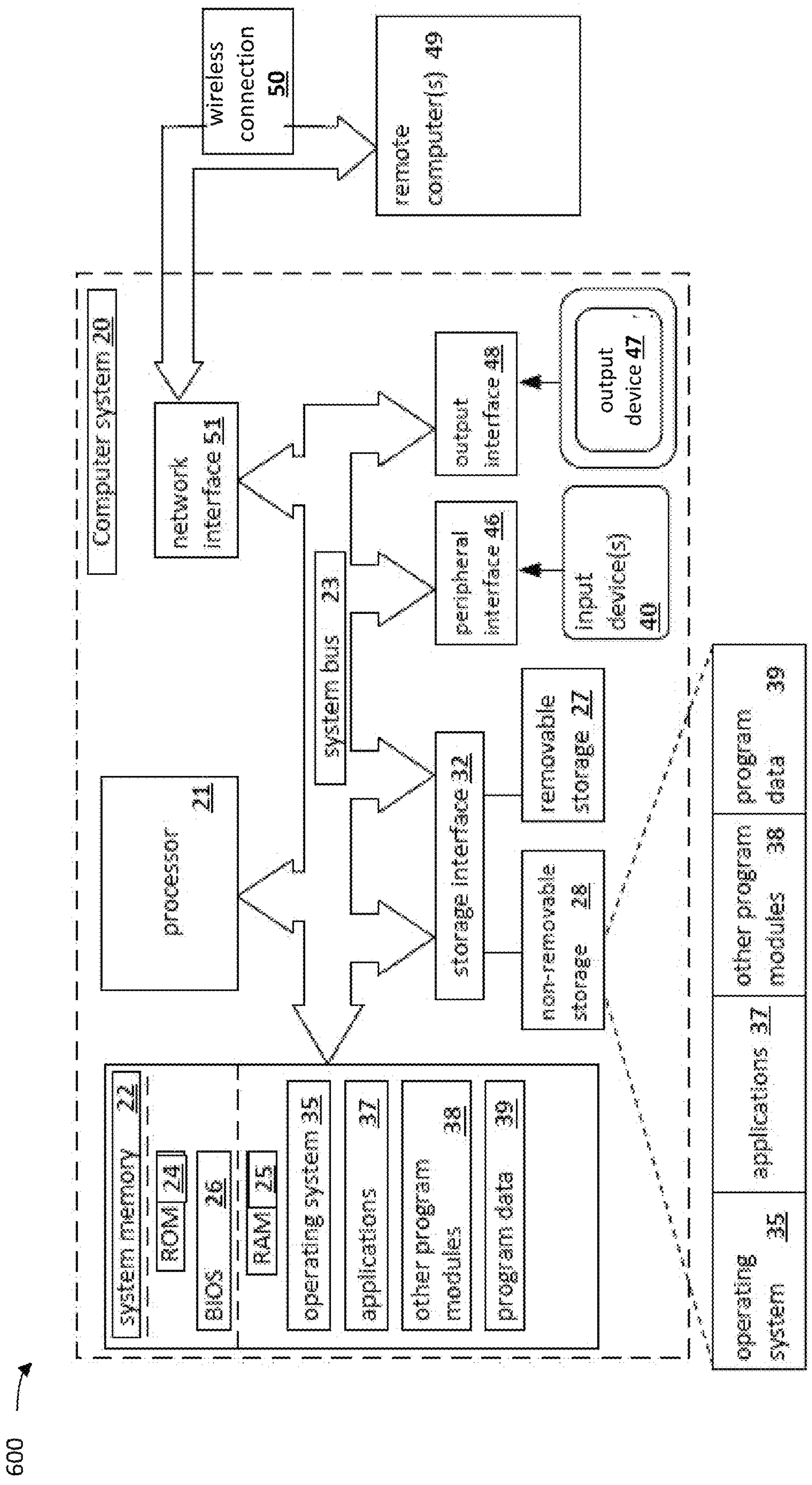
FIG. 6 presents an example of a general-purpose computer system on which aspects of the present disclosure can be implemented.

In some aspects, training an emotionalization ML model can include providing to the emotionalization ML module 216 a training dataset including: a plurality of training parameters indicating different driving conditions and environments, including: vehicle control parameters, vehicle navigation parameters, road condition parameters, and/or driver condition parameters; predetermined driving instructions, corresponding to the plurality of training parameters, indicating recommended driving actions for a driver of the vehicle to assure safe operation of the vehicle and/or to avoid driving accidents; and predetermined emotional prosody parameters, corresponding to the driving instructions, indicating a preferred emotional prosody of playback of the driving instructions to the driver in order to impart a required level of urgency and/or level of importance to the driving instructions; and training the emotionalization ML module 216 using the provided training dataset FIG. 6 is a block diagram 600 illustrating a computer system 20 on which aspects of systems and methods for personalized driving instructions may be implemented in accordance with an example aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, a proprietary device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 3A-3B may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device (e.g., touchscreen and/or dedicated physical interface buttons or switches), gaze tracker, gesture tracker, or other peripheral devices, such as a printer, scanner, and/or one or more sensors via one or more I/O ports, such as a serial port, a parallel port, a universal serial bus (USB), or other peripheral interface. An output device 47 such as one or more speakers and/or one or more monitors, projectors, integrated displays, heads-up displays (HUDs), may also be connected to the system bus 23 across an output interface 48, such as an audio and/or video adapter. In addition to the output devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a wireless connection 50, cellular and/or other data network, an intranet, and the Internet. Examples of the network interface 51 may include one or more wireless interfaces, such as a wireless network adapter.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A machine learning (ML) based method for providing driving instructions in a vehicle, comprising:

acquiring in real time, a plurality of parameters from a plurality of vehicle systems, sensors and other external sources of information;

analyzing the acquired parameters using a trained driving analysis ML model configured to generate: driving instructions for a driver of the vehicle and corresponding emotional prosody parameters indicating a level of urgency and/or level of importance of the driving instructions, wherein the trained driving analysis ML model is configured to perform a classification task that predicts the driving instructions as discrete classes from a set of predefined instructions based on the acquired parameters, and a regression task that predicts the corresponding emotional prosody parameters as a set of continuous prosody features including pitch, volume, and speech rate;

generating a voice audio recording of the driving instructions, wherein the driving instructions are recorded in a neutral tone of voice with the corresponding emotional prosody parameters set at a predefined base level;

applying, to the voice audio recording of the driving instructions, a trained voice emotionalization ML model configured to modify emotional prosody of the voice audio recording of the driving instructions based on the corresponding emotional prosody parameters to generate an emotionalized voice audio recording of the driving instructions; and providing the emotionalized voice audio recording of the driving instructions for audio playback to the driver via a speaker in the vehicle.

2. The method of claim 1, further comprising:

personalizing the driving instructions based on driver profile parameters, including one or more of: spoken language, age, accent, disability and/or driving experience, to generate personalized driving instructions.

3. The method of claim 1, wherein the plurality of parameters from the plurality of vehicle systems, sensors and other external sources include one or more of:

a plurality of vehicle control parameters from at least one vehicle control system;

a plurality of vehicle navigation parameters from at least one vehicle navigation system;

a plurality of road condition parameters from a plurality of vehicle road sensors; and a plurality of driver condition parameters from one or more driver sensors; and weather conditions and/or road reports from other external sources.

4. The method of claim 1, wherein the driving analysis ML model includes one or more of: Classification models, Regression models and Time Delay Neural Networks (TDNNs), and wherein the voice emotionalization ML model include one or more of: Generative Adversarial Networks (GANs), Variational Autoencoders (VAEs), or Sequence-to-Sequence models.

5. The method of claim 1, wherein the emotional prosody parameters include one or more of: pitch, loudness, timbre, speech rate, and pauses, wherein the emotionalized voice audio recording of the driving instructions are further generated with spatial features.

6. The method of claim 1, further includes training the driving analysis ML model by:

(i) providing to the driving analysis ML model a training dataset comprising:

a. a plurality of training parameters indicating different driving conditions and environments, including: vehicle control parameters, vehicle navigation parameters, road condition parameters, weather conditions, ambient noise levels and/or driver condition parameters;

b. predetermined driving instructions, corresponding to the plurality of training parameters, indicating recommended driving actions for a driver of the vehicle to assure safe operation of the vehicle and/or to avoid driving accidents; and c. predetermined emotional prosody parameters, corresponding to the driving instructions, indicating a preferred emotional prosody of playback of the driving instructions to the driver in order to impart a required level of urgency and/or level of importance to the driving instructions; and training the driving analysis ML model using the provided training dataset.

7. The method of claim 2, wherein personalizing the driving instruction includes:

fine-tuning the driving analysis ML model to modify the driving instructions based on one or more driver profile parameters to generate personalized driving instructions; or applying to the driving instructions a trained personalization ML model configured to modify the driving instructions based on one or more driver profile parameters.

8. The method of claim 7, further includes training the driving analysis ML model and/or the personalization ML model to personalize the driving instruction, including:

(i) providing to a ML model a training dataset, comprising:

a. a plurality of predetermined driving instructions;

b. a plurality of predetermined driver profile parameters, including: driver's spoken language, driver's accent, driver's age, driver's disability and/or driver's driving experience; and c. a plurality of personalized driving instructions corresponding to the plurality of predetermined driving instructions modified based on one or more driver profile parameters; and (ii) training the ML model using the provided training dataset.

9. The method of claim 1, wherein generating a voice audio recording of the driving instructions further comprises one or more of:

converting the driving instructions into audio using a voice synthesizer;

selecting a pre-recorded voice audio clip corresponding to the driving instructions from a database of pre-recorded voice audio clips.

10. The method of claim 1, further includes training the voice emotionalization ML model, including:

(i) providing to the voice emotionalization ML model a training dataset comprising:

a. a plurality of pre-recorded emotionalized voice audio recordings of driving instructions corresponding to different driving conditions and environments, and corresponding prosody parameters for each audio recording; and b. the same pre-recorded audio recordings of driving instructions in a neutral-tone voice, and corresponding prosody parameters set at the base level; and (ii) training the voice emotionalization ML model using the provided training dataset.

11. A ML-based system for providing driving instructions in a vehicle, comprising:

at least one memory; and at least one processor coupled with the at least one memory and configured, individually or in combination, to:

acquire in real time, a plurality of parameters from a plurality of vehicle systems, sensors and other external sources of information;

analyze the acquired parameters using a trained driving analysis ML model configured to generate: driving instructions for a driver of the vehicle and corresponding emotional prosody parameters indicating a level of urgency and/or level of importance of the driving instructions, wherein the trained driving analysis ML model is configured to perform a classification task that predicts the driving instructions as discrete classes from a set of predefined instructions based on the acquired parameters, and a regression task that predicts the corresponding emotional prosody parameters as a set of continuous prosody features including pitch, volume, and speech rate;

generate a voice audio recording of the driving instructions, wherein the driving instructions are recorded in a neutral tone of voice with the corresponding emotional prosody parameters set at a predefined base level;

apply, to the voice audio recording of the driving instructions, a trained voice emotionalization ML model configured to modify emotional prosody of the voice audio recording of the driving instructions based on the corresponding emotional prosody parameters to generate an emotionalized voice audio recording of the driving instructions with spatial features; and provide the emotionalized voice audio recording of the driving instructions for audio playback to the driver via a speaker in the vehicle.

12. A non-transitory computer readable medium storing thereon computer executable instructions for providing driving instructions in a vehicle, including instructions for:

acquiring in real time, a plurality of parameters from a plurality of vehicle systems, sensors and other external sources of information;

analyzing the acquired parameters using a trained driving analysis ML model configured to generate: driving instructions for a driver of the vehicle and corresponding emotional prosody parameters indicating a level of urgency and/or level of importance of the driving instructions, wherein the trained driving analysis ML model is configured to perform a classification task that predicts the driving instructions as discrete classes from a set of predefined instructions based on the acquired parameters, and a regression task that predicts the corresponding emotional prosody parameters as a set of continuous prosody features including pitch, volume, and speech rate;

generating a voice audio recording of the driving instructions, wherein the driving instructions are recorded in a neutral tone of voice with the corresponding emotional prosody parameters set at a predefined base level;

applying, to the voice audio recording of the driving instructions, a trained voice emotionalization ML model configured to modify emotional prosody of the voice audio recording of the driving instructions based on the corresponding emotional prosody parameters to generate an emotionalized voice audio recording of the driving instructions with spatial features; and providing the emotionalized voice audio recording of the driving instructions for audio playback to the driver via a speaker in the vehicle.

13. The system of claim 11, wherein the plurality of parameters from the plurality of vehicle systems, sensors and other external sources include one or more of:

a plurality of vehicle control parameters from at least one vehicle control system;

a plurality of vehicle navigation parameters from at least one vehicle navigation system;

a plurality of road condition parameters from a plurality of vehicle road sensors; and
a plurality of driver condition parameters from one or more driver sensors; and
weather conditions and/or road reports from other external sources.

14. The system of claim 11, wherein the driving analysis ML model includes one or more of: Classification models, Regression models and Time Delay Neural Networks (TDNNs), and wherein the voice emotionalization ML model include one or more of: Generative Adversarial Networks (GANs), Variational Autoencoders (VAEs), or Sequence-to-Sequence models.

15. The system of claim 11, wherein the emotional prosody parameters include one or more of: pitch, loudness, timbre, speech rate, and pauses, wherein the emotionalized voice audio recording of the driving instructions are further generated with spatial features.

16. The system of claim 11, wherein the least one processor further configured to train the driving analysis ML model by:
(i) providing to the driving analysis ML model a training dataset comprising:
a. a plurality of training parameters indicating different driving conditions and environments, including: vehicle control parameters, vehicle navigation parameters, road condition parameters, weather conditions, ambient noise levels and/or driver condition parameters;
b. predetermined driving instructions, corresponding to the plurality of training parameters, indicating recommended driving actions for a driver of the vehicle to assure safe operation of the vehicle and/or to avoid driving accidents; and
c. predetermined emotional prosody parameters, corresponding to the driving instructions, indicating a preferred emotional prosody of playback of the driving instructions to the driver in order to impart a required level of urgency and/or level of importance to the driving instructions; and
training the driving analysis ML model using the provided training dataset.

17. The system of claim 11, wherein the at least one processor is further configured to personalize the driving instructions, wherein personalizing the driving instructions includes:
fine-tuning the driving analysis ML model to modify the driving instructions based on one or more driver profile parameters to generate personalized driving instructions; or
applying to the driving instructions a trained personalization ML model configured to modify the driving instructions based on one or more driver profile parameters.

18. The system of claim 17, wherein the least one processor further configured to train the driving analysis ML model and/or the personalization ML model to personalize the driving instruction, including:
(i) providing to a ML model a training dataset, comprising:
a. a plurality of predetermined driving instructions;
b. a plurality of predetermined driver profile parameters, including: driver's spoken language, driver's accent, driver's age, driver's disability and/or driver's driving experience; and
c. a plurality of personalized driving instructions corresponding to the plurality of predetermined driving instructions modified based on one or more driver profile parameters; and
(ii) training the ML model using the provided training dataset.

19. The system of claim 11, wherein generating a voice audio recording of the driving instructions further comprises one or more of:
converting the driving instructions into audio using a voice synthesizer;
selecting a pre-recorded voice audio clip corresponding to the driving instructions from a database of pre-recorded voice audio clips.

20. The system of claim 11, further includes training the voice emotionalization ML model, including:
(i) providing to the voice emotionalization ML model a training dataset comprising:
a. a plurality of pre-recorded emotionalized voice audio recordings of driving instructions corresponding to different driving conditions and environments, and corresponding prosody parameters for each audio recording; and
b. the same pre-recorded audio recordings of driving instructions in a neutral-tone voice, and corresponding prosody parameters set at the base level; and
(ii) training the voice emotionalization ML model using the provided training dataset.

* * * * *